United States Patent
Khashman

(10) Patent No.: US 12,387,275 B2
(45) Date of Patent: Aug. 12, 2025

(54) SYSTEMS AND METHODS FOR MACHINE LEARNING-BASED ROUTING OF ADVERSE DIGITAL CLAIMS

(71) Applicant: Technology Partners LLC, Charlotte, NC (US)

(72) Inventor: Sam Faris Khashman, Charlotte, NC (US)

(73) Assignee: Technology Partners LLC, Charlotte, NC (US)

(\*) Notice: Subject to any disclaimer, the term of this patent is extended or adjusted under 35 U.S.C. 154(b) by 0 days.

(21) Appl. No.: 18/901,279

(22) Filed: Sep. 30, 2024

(65) Prior Publication Data

US 2025/0111440 A1    Apr. 3, 2025

Related U.S. Application Data

(60) Provisional application No. 63/541,078, filed on Sep. 28, 2023.

(51) Int. Cl.
*G06Q 40/08* (2012.01)

(52) U.S. Cl.
CPC .................... *G06Q 40/08* (2013.01)

(58) Field of Classification Search
CPC .................................. G06Q 40/08
USPC ............................................ 705/4
See application file for complete search history.

(56) References Cited

U.S. PATENT DOCUMENTS

| | | | |
|---|---|---|---|
| 11,315,196 B1* | 4/2022 | Narayan | G06F 18/2193 |
| 11,538,112 B1* | 12/2022 | Singh | G06Q 10/10 |
| 2018/0226143 A1* | 8/2018 | Khashman | G06F 16/254 |
| 2021/0241378 A1* | 8/2021 | Magnuson | G06Q 10/10 |
| 2021/0357316 A1* | 11/2021 | Chang | G06N 20/00 |
| 2021/0383480 A1* | 12/2021 | Tabak | H04L 9/3247 |
| 2022/0044328 A1* | 2/2022 | Ligon | G16H 10/60 |
| 2022/0198576 A1* | 6/2022 | Shields | G06N 20/00 |
| 2022/0319678 A1* | 10/2022 | Harada | G06Q 10/063112 |
| 2023/0214455 A1* | 7/2023 | Menard | G06N 3/044 706/12 |
| 2023/0410211 A1* | 12/2023 | Chehrazi | G06Q 50/00 |
| 2024/0394801 A1* | 11/2024 | Fossier | G16H 50/70 |

\* cited by examiner

*Primary Examiner* — Robert R Niquette
(74) *Attorney, Agent, or Firm* — Padowithz Alce; Quintin Scheitlin; Alce PLLC

(57) ABSTRACT

A system, method, and computer-program product includes obtaining, from a computer database, claim data associated with a digital claim that has an adverse decision, extracting, using one or more feature extractors, one or more corpora of feature vectors from the claim data associated with the digital claim, computing, using a claim assessment machine learning model, a claim assessment inference that includes a likelihood of the adverse decision being reversed for the digital claim based on the claim assessment machine learning model receiving the one or more corpora of feature vectors, and automatically routing the digital claim to a target claim handling queue of a plurality of distinct claim handling queues based on the likelihood of the adverse decision being reversed for the digital claim.

21 Claims, 13 Drawing Sheets

200

Configuring an Adverse Claim Assessment Machine Learning Model and an Adverse Claim Rationale Machine Learning Model S210

Obtaining Adverse Digital Claim Data Associated with a Subject Adverse Digital Claim S220

Generating an Adverse Digital Claim Assessment Inference based on the Subject Adverse Digital Claim S230

Generating an Adverse Claim Rationale Inference based on the Subject Adverse Digital Claim S240

Routing the Subject Adverse Digital Claim S250

Patient | Insurance | Insured | Smart Assist | Notes | EOB aiFix It

Claim Recommendations

| Field Name | Existing Value | Recommended Value | Accept? |
|---|---|---|---|
| Payer | Payer ID: 59069 | Group Number: 00000000003<br>Plan Number: 3 | ◯ |

1 Charge Recommendations ▽ ⚙

Charge Recommendations

| Charge ID | Procedure Code. |
|---|---|
| 2169702 | 70450 |

| Field Name | Existing Value | Recommended Value | Accept? |
|---|---|---|---|
| Modifier | 26, X5 | 26, GW, X5 | ◯ |

Smart Assist

Payer: All relevant fields in the Claim form for the Claim RAD388273 needs to be updated for the new Payer.

Modifier: Recommendation holds only when the service providers are not the attending physicians at the hospice of the patients. If the providers are the attending physician and the diagnosis is related to hospice diagnosis, GV might be a more appropriate modifier.

Feedback  Cancel  Apply & Resubmit ⌄  Accept Denial

FIGURE 12

SYSTEMS AND METHODS FOR MACHINE LEARNING-BASED ROUTING OF ADVERSE DIGITAL CLAIMS

CROSS-REFERENCE TO RELATED APPLICATIONS

This application claims the benefit of U.S. Provisional Application No. 63/541,078, filed on 28 Sep. 2023, which is incorporated in its entirety by this reference.

TECHNICAL FIELD

This invention relates generally to the computer-based learning field and, more specifically, to new and useful systems and methods that utilize machine learning inferences to accelerate a routing and/or remediation of adverse digital claims.

BACKGROUND

Traditionally, in the healthcare sector, the process of identifying and appealing denied medical claims is a very labor-intensive and time-consuming process. This process is typically performed by human analysts, who possess a high-level of specialized knowledge in medical billing and coding. These analysts meticulously review each denied medical claim to identify and respond to the reasons for denial. However, this process struggles to scale effectively in scenarios where hundreds or even thousands of denied medical claims require assessment.

Therefore, there is a need in the art for using machine learning to accelerate adverse digital claim assessments and routing. The embodiments of the present application provide technical solutions that address, at least, the needs described above, as well as the deficiencies of the state of the art.

BRIEF SUMMARY OF THE INVENTION(S)

In one embodiment, a computer-implemented method includes obtaining, from a computer database, claim data associated with a digital claim that has an adverse decision; extracting, using one or more feature extractors, one or more corpora of feature vectors from the claim data associated with the digital claim, wherein extracting the one or more corpora of feature vectors includes: extracting a first corpus of feature vectors that includes feature data associated with a target entity that issued the adverse decision, and extracting a second corpus of feature vectors that includes feature data associated with the digital claim; computing, using a claim assessment machine learning model, a claim assessment inference based on the claim assessment machine learning model receiving the one or more corpora of feature vectors, wherein the claim assessment inference includes a likelihood of the adverse decision being reversed for the digital claim; automatically routing the digital claim to a target claim handling queue of a plurality of distinct claim handling queues based on the likelihood of the adverse decision being reversed for the digital claim, wherein: the digital claim is routed to a digital claim review queue when the likelihood of the adverse decision being reversed for the digital claim fails to satisfy a predetermined minimum threshold, and the digital claim is routed to a digital claim remediation queue when the likelihood of the adverse decision being reversed for the digital claim satisfies the predetermined minimum threshold.

In one embodiment, the claim assessment inference includes a claim dispute score that indicates the likelihood of the adverse decision being reversed for the digital claim, the claim dispute score satisfies the predetermined minimum threshold, and the computer-implemented method further includes: extracting, using the one or more feature extractors, a second corpus of feature vectors from the claim data associated with the digital claim, wherein the second corpus of feature vectors includes feature data indicative of a likely denial type or a likely denial reason of the digital claim; and computing, using one or more downstream machine learning models, a likely claim denial type of the digital claim and one or more proposed claim modifications to the digital claim based on the likely claim denial type.

In one embodiment, the computer-implemented method further includes identifying the likely claim denial type of the digital claim and the one or more proposed claim modifications to the digital claim satisfies automated claim remediation criteria, the computer-implemented method further includes: automatically adapting the digital claim to an adapted digital claim based on the likely claim denial type of the digital claim and the one or more proposed claim modifications satisfying the automated claim remediation criteria, wherein automatically adapting the digital claim to the adapted digital claim includes automatically adjusting one or more portions or one or more sections of the digital claim based on the one or more proposed claim modifications; and automatically transmitting, via a computer network, the adapted digital claim to the target entity that issued the adverse decision.

In one embodiment, the computer-implemented method further includes identifying the likely claim denial type of the digital claim and the one or more proposed claim modifications to the digital claim fails to satisfy automated claim remediation criteria, bypassing an automatic adaptation of the digital claim based on identifying the likely claim denial type of the digital claim and the one or more proposed claim modifications to the digital claim fails to satisfy the automated claim remediation criteria, and displaying, via a graphical user interface, a representation of the digital claim, wherein the graphical user interface includes a plurality of distinct claim sections that includes the claim data, and the one or more proposed claim modifications to the digital claim.

In one embodiment, the computer-implemented method further includes visually emphasizing, on the graphical user interface, a selective subset of claim sections of the plurality of distinct claim sections that map to the one or more proposed claim modifications, wherein visually emphasizing the selective subset of claim sections indicates to a user where likely claim changes are needed within the digital claim.

In one embodiment, the computer-implemented method further includes receiving, via the graphical user interface, an input from the user selecting a claim adaptation control element of the graphical user interface, in response to receiving the input from the user selecting the claim adaptation control element, automatically adapting a data structure underpinning the digital claim to incorporate the one or more proposed claim modifications, and updating, in real-time, the representation of the digital claim to correspond to the adapted data structure.

In one embodiment, one of the one or more proposed claim modifications corresponds to correcting one or more portions of the data structure underpinning the digital claim to satisfy claim requirements of the target entity, the claim requirements of the target entity are not published nor made publicly available by the target entity, and the claim requirements of the target entity are learned by the one or more downstream machine learning models based on training the one or more downstream machine learning models on historical claim data involving the target entity.

In one embodiment, a first feature of the second corpus of feature vectors represents a diagnosis code included in the digital claim, a second feature of the second corpus of feature vectors represents a procedure code included in the digital claim, and the claim assessment machine learning model uses the first feature of the second corpus of feature vectors and the second feature of the second corpus of feature vectors to assist with computing the likelihood of the adverse decision being reversed for the digital claim.

In one embodiment, a computer-program product embodied in a non-transitory machine-readable storage medium storing computer instructions that, when executed by one or more processors, perform operations including obtaining, from a computer database, medical claim data associated with a medical claim that was denied by a target entity; extracting, using one or more feature extractors, one or more corpora of feature vectors from the medical claim data associated with the medical claim, wherein extracting the one or more corpora of feature vectors includes extracting a first corpus of feature vectors that includes feature data associated with the target entity, and extracting a second corpus of feature vectors that includes feature data associated with the medical claim; computing, using a claim assessment machine learning model, a claim assessment inference based on the claim assessment machine learning model receiving the one or more corpora of feature vectors, wherein the claim assessment inference includes a likelihood of the medical claim being approved by the target entity on appeal; automatically routing, via the one or more processors, the medical claim to a target claim handling queue of a plurality of distinct claim handling queues based on the likelihood of the medical claim being approved on appeal, wherein: the medical claim is routed to a claim review queue when the likelihood of the medical claim being approved on appeal fails to satisfy a predetermined minimum claim approval threshold, and the medical claim is routed to a claim remediation queue when the likelihood of the medical claim being approved on appeal satisfies the predetermined minimum claim approval threshold.

In one embodiment, the likelihood of the medical claim being approved on appeal satisfies the predetermined minimum claim approval threshold, in response to determining, via the one or more processors, the likelihood of the medical claim being approved on appeal satisfies the predetermined minimum claim approval threshold: extracting, using the one or more feature extractors, a second corpus of feature vectors from the medical claim data associated with the medical claim, wherein the second corpus of feature vectors includes feature data indicative of a likely denial type or a likely denial reason of the medical claim denied by the target entity; and computing, using a denial type machine learning classification model, a denial-type classification inference based on the denial type machine learning classification model receiving the second corpus of feature vectors, wherein the denial-type classification inference includes a denial-type associated with the medical claim denied by the target entity.

In one embodiment, the computer-program product further includes implementing a multi-stage denied claim classification and remediation pipeline, wherein: a first stage of the multi-stage denied claim classification and remediation pipeline includes the computing, by the claim assessment machine learning model, the claim assessment inference, a second stage of the multi-stage denied claim classification and remediation pipeline includes the computing, by the denial type machine learning classification model, the denial-type classification inference, wherein the second stage of the multi-stage denied claim classification and remediation pipeline occurs after the first stage of the multi-stage denied claim classification and remediation pipeline, and a third stage of the multi-stage denied claim classification and remediation pipeline includes executing one or more claim remediation actions based on the denial-type classification inference, wherein executing the one or more claim remediation actions includes: adapting the medical claim to an adapted medical claim that corrects one or more defects in the medical claim, and re-submitting the adapted medical claim to the target entity for evaluation.

In one embodiment, the medical claim data associated with the medical claim includes a denial reason code or message from the target entity, the denial reason code or message from the target entity is insufficient for determining an exact reason that the target entity denied the medical claim, the denial type machine learning classification model is configured to decode or translate the denial reason code or message provided by the target entity into an explainable denial type that identifies likely defective areas or elements within a subject denied medical claim, and the denial-type classification inference computed by the denial type machine learning classification model for the medical claim further includes one or more likely defective areas or one or more likely defective elements within the medical claim that requires correction.

In one embodiment, the computer-program product further includes assessing, via the one or more processors, the denial-type computed for the medical claim by the denial type machine learning classification model against automated claim remediation criteria; identifying, via the one or more processors, the denial-type computed for the medical claim satisfies at least one automated claim remediation criterion of the automated claim remediation criteria; automatically adapting, via the one or more processors, the medical claim to an adapted medical claim by automatically correcting one or more defective sections or one or more defective portions of the medical claim based on the denial-type classification inference; and automatically transmitting, via the one or more processors, the adapted medical claim to the target entity for review in response to correcting the one or more defective sections or the one or more defective portions of the medical claim.

In one embodiment, the denial-type classification inference further includes a proposed change to the medical claim that, when implemented, increases a probability of the medical claim being approved by the target entity on appeal, a confidence score of the denial-type classification inference fails to satisfy an automated claim remediation threshold, and the computer-program product further comprises computer instructions for performing operations including: displaying, via a graphical user interface, a representation of the medical claim based on the confidence score of the denial-type classification inference failing to satisfy the automated claim remediation threshold, wherein the representation of the medical claim further includes a claim remediation user interface element that includes the proposed change to the medical claim in natural language; receiving, via the graphical user interface, a first user input selecting a claim correction button; in response to receiving the first user input selecting the claim correction button, displaying a claim adjustment proposal user interface that presents a current value of the medical claim identified to be defective by the denial-type classification inference and the proposed change to the current value, wherein the proposed change includes a proposed value; automatically implementing the proposed change to the medical claim by replacing the current value with the proposed value in response to receiving a second user input selecting an automated claim remediation button of the claim adjustment proposal user interface; and automatically transmitting the medical claim that includes the proposed value to the target entity.

In one embodiment, the computer-program product further includes obtaining a corpus of labeled training data samples, wherein each distinct labeled training data sample of the corpus of labeled training data samples includes a distinct historical medical claim, a corresponding denial type label, and a corresponding set of features of the distinct historical medical claim indicative of the corresponding denial type label, configuring the denial type machine learning classification model based on a training of a target machine learning classification model using the corpus of labeled training data samples.

In one embodiment, the computer-program product further includes obtaining a corpus of labeled sequential training data samples, wherein each labeled sequential training data sample includes: an initial version of a medical claim that was denied by a subject entity, one or more distinct resubmissions of the medical claim, wherein each distinct resubmission of the medical claim includes at least one claim modification over a previous submission associated with the medical claim, and a corresponding outcome label for each distinct resubmission that indicates whether a subject resubmission was approved or denied; and configuring the claim assessment machine learning model based on a training of a target machine learning model using the corpus of labeled sequential training data samples.

In one embodiment, the likelihood of the medical claim being approved on appeal fails to satisfy the predetermined minimum claim approval threshold, the computer-program product further comprises computer instructions for performing operations including bypassing a routing of the medical claim to a downstream machine learning model based on identifying the likelihood of the medical claim fails to satisfy the predetermined minimum claim approval threshold.

In one embodiment, the claim assessment inference includes an adverse claim dispute score, the adverse claim dispute score indicates the likelihood of the medical claim being approved by the target entity on appeal, and the medical claim is routed to the claim review queue when the adverse claim dispute score that corresponds to the medical claim fails to satisfy a predetermined minimum claim approval threshold, and the medical claim is routed to the claim remediation queue when the adverse claim dispute score that corresponds to the medical claim satisfies the predetermined minimum claim approval threshold.

In one embodiment, the computer-program product further includes identifying, via the one or more processors, a new medical claim that has not been filed with the target entity; computing, using the claim assessment machine learning model, a claim assessment inference for the new medical claim that predicts a probability of approval if the new medical claim were to be filed with the target entity, wherein the probability of approval of the new medical claim fails to satisfy the predetermined minimum claim approval threshold; identifying, via the one or more processors, an attempt by a user to electronically transmit the new medical claim to the target entity; and in response to identifying the attempt to electronically transmit the new medical claim to the target entity preventing a submission of the new medical claim based on identifying that the probability of approval of the new medical claim fails to satisfy the predetermined minimum claim approval threshold, and surfacing, via a graphical user interface, a notification that informs the user the new medical claim is unlikely to be approved by the target entity, wherein the notification includes: a message indicating that the probability of approval that corresponds to the new medical claim is below the predetermined minimum claim approval threshold, an explanation of one or more likely factors contributing to the probability of approval of the new medical claim being below the predetermined minimum claim approval threshold, and one or more proposed claim remediation actions for the new medical that, if implemented, increases a likelihood that the new medical claim is approved by the target entity.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: obtaining, from a computer database, claim data associated with a digital claim that has an adverse decision; extracting, using one or more feature extractors, one or more corpora of feature vectors from the claim data associated with the digital claim, wherein extracting the one or more corpora of feature vectors includes: extracting a first corpus of feature vectors that includes feature data associated with a target entity that issued the adverse decision, and extracting a second corpus of feature vectors that includes feature data associated with the digital claim; computing, using a claim assessment machine learning model, a claim assessment inference based on the claim assessment machine learning model receiving the one or more corpora of feature vectors, wherein the claim assessment inference includes a likelihood of the adverse decision being reversed for the digital claim; automatically routing the digital claim to a target claim handling queue of a plurality of distinct claim handling queues based on the likelihood of the adverse decision being reversed for the digital claim, wherein: the digital claim is routed to a digital claim review queue when the likelihood of the adverse decision being reversed for the digital claim fails to satisfy a predetermined minimum threshold, and the digital claim is routed to a digital claim remediation queue when the likelihood of the adverse decision being reversed for the digital claim satisfies the predetermined minimum threshold.

In one embodiment, one of the one or more proposed claim modifications corresponds to correcting one or more portions of the data structure underpinning the digital claim to satisfy claim approval requirements of the target entity, the claim approval requirements of the target entity are not published nor made publicly available by the target entity, and the claim approval requirements of the target entity are learned by the one or more downstream machine learning models based on training the one or more downstream machine learning models on historical claim data involving the target entity.

BRIEF DESCRIPTION OF THE FIGURES

FIG. 2 illustrates an example method 200 in accordance with one or more embodiments of the present application;

FIG. 5 illustrates an example of a graphical user interface displaying a representation of an adverse claim queue in accordance with one or more embodiments of the present application;

Figure 8:
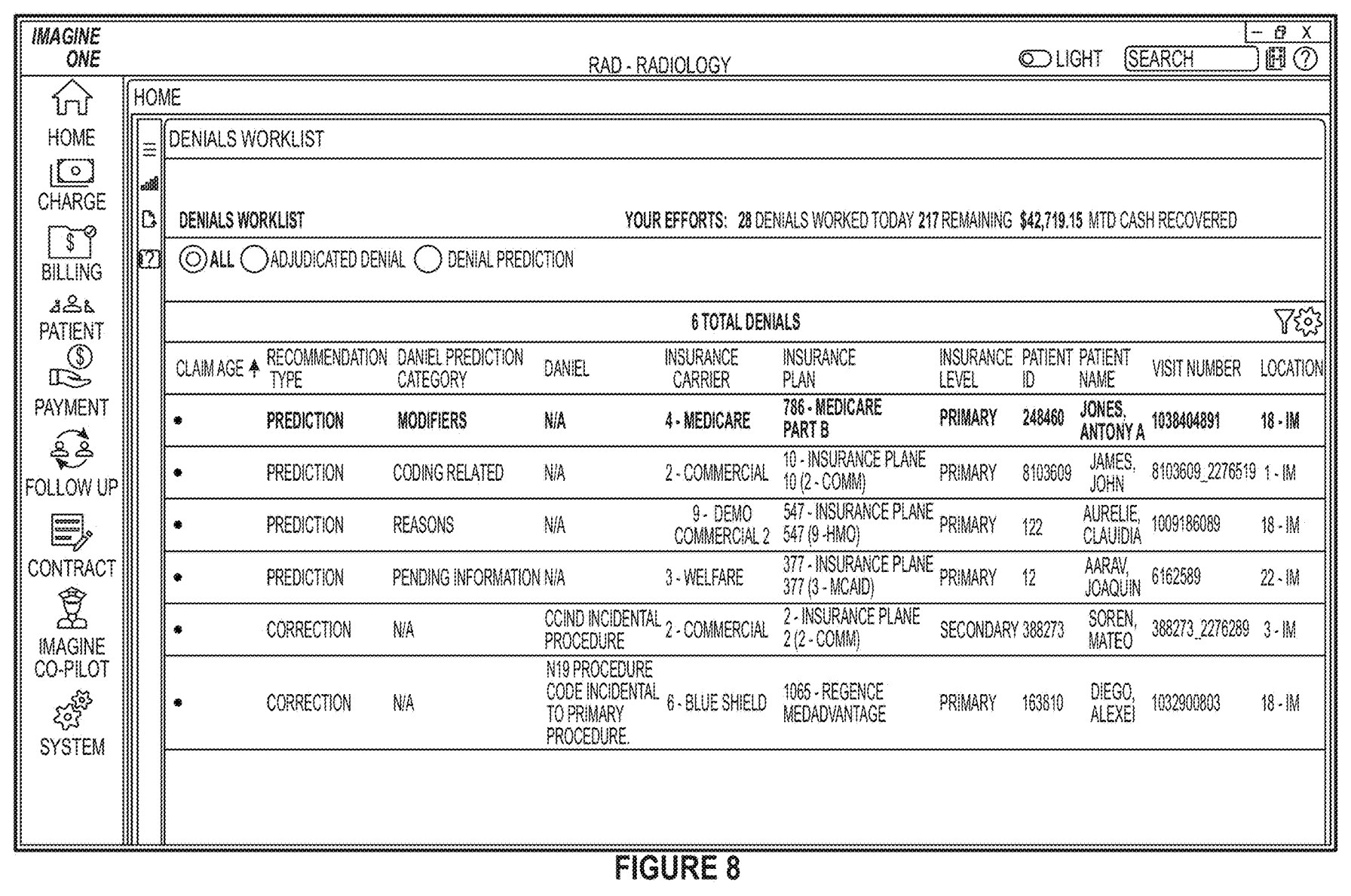
Figure 9:
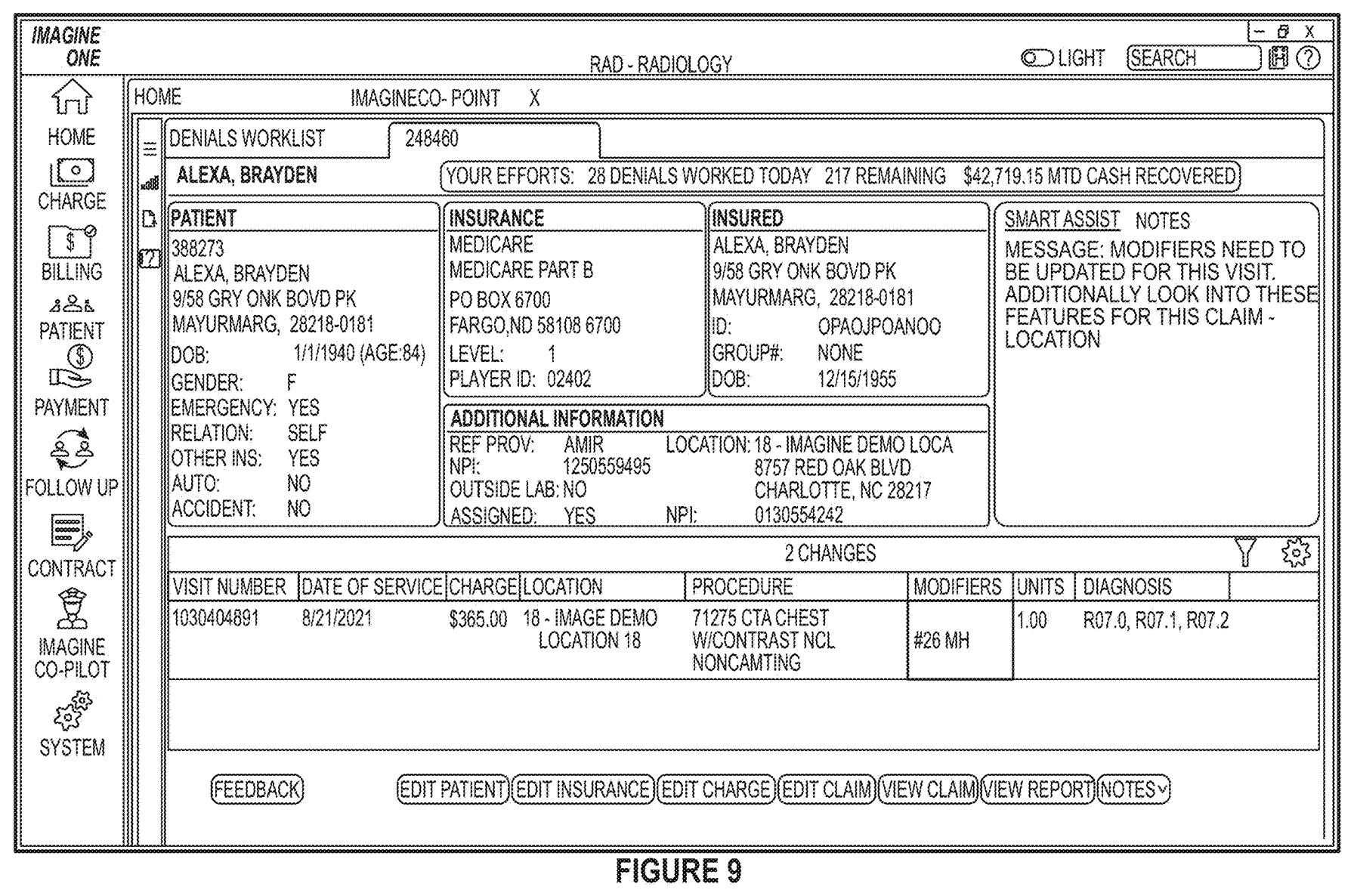
Figure 10:
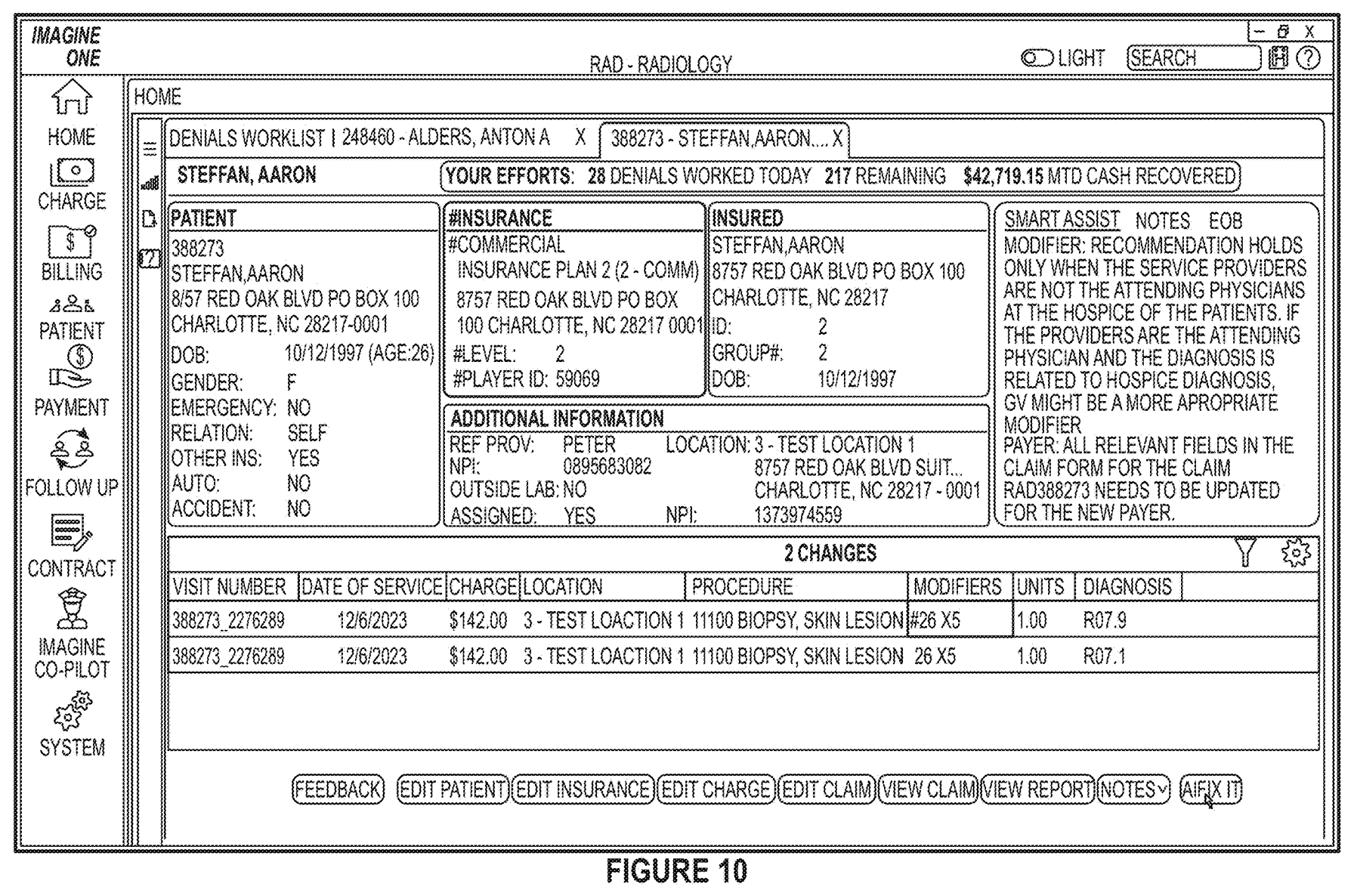

FIGS. 8-12 illustrate example graphical user interfaces for accelerating a remediation of a claim, according to some embodiments of the present application.

DESCRIPTION OF THE PREFERRED EMBODIMENTS

Figure 1:
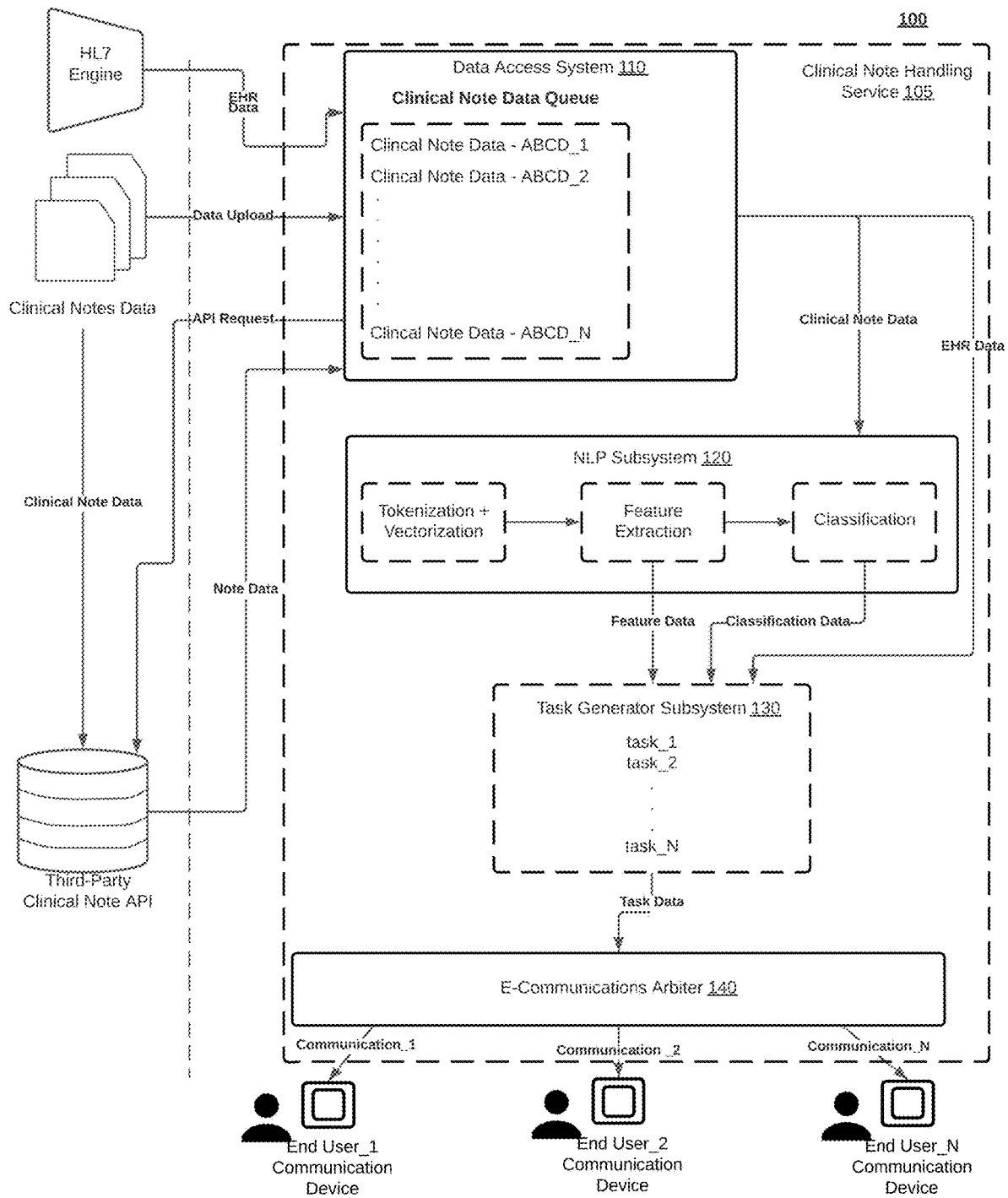
FIG. 1 illustrates a schematic representation of a system 100 in accordance with one or more embodiments of the present application.

The following description of the preferred embodiments of the invention is not intended to limit the invention to these preferred embodiments, but rather to enable any person skilled in the art to make and use this invention.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

The systems, methods, and embodiments described herein may be used in a variety of technology areas where creating, filing, and appealing claims occur. This includes, but is not limited to, healthcare claim management and other sectors, technology areas, or industries where a large volume (e.g., hundreds, thousands, or millions) of claims are regularly denied, disputed, or require multiple stages of appeal.

As described in more detail herein, the systems, methods, and embodiments, may be configured to autonomously assess a denied claim, predict the probability of success of the denied claim being approved on an appeal, and route the denied claim for disposition or remediation (e.g., automated remediation, semi-automated remediation, etc.) using one or more machine learning models. Using machine learning in such a manner provides many technical benefits and advantages.

For instance, at least one technical advantage of some of the systems, methods, and embodiments described in the present application may include the ability to quickly and/or automatically process large volumes of denied claims with high accuracy. By leveraging machine learning, the systems, methods, and embodiments may handle hundreds, thousands, or even millions of claims simultaneously, significantly reducing the time required to evaluate and handle denied claims (e.g., claims associated with adverse decisions).

Another technical advantage of some of the systems, methods, and embodiments described in the present application may include the ability to automatically route denied claims based on predicted outcomes generated by one or more machine learning models. Denied claims with a higher likelihood of being successfully appealed may be automatically routed to a remediation queue for remediation (e.g., automated remediation, semi-automated remediation with user input, etc.), while denied claims with a lower likelihood of being successfully appealed may be routed to a disposition queue, disposal queue, a review queue, or the like. At least one technical benefit of such automated routing is that the systems, methods, and embodiments may automatically respond to denied claims without human intervention, allowing analysts to focus on more complex or difficult claims.

Another technical advantage of some of the systems, methods, and embodiments described in the present application may include the ability to translate or decode non-interpretable denial reasons provided by target entities. Often, when a claim is denied, the reasons for the denial are vague, unclear, or lack sufficient detail to be actionable. This creates a "black box" effect, where claim handlers struggle to understand the exact cause of the denial, making it difficult to resolve or appeal the claim effectively. However, using the one or more machine learning models described herein, the systems, methods, and embodiments may translate or decode non-interpretable denial reasons provided by target entities to an explainable denial reason that informs downstream claim remediation actions.

Another technical advantage of some of the systems, methods, and embodiments described in the present application may include the ability to accurately determine the reasons for claim denials. Each payer often has its own unique claim requirements, rules, and processes that may or may not be publicly known, making it difficult to identify the exact cause or reason of a denial. However, the systems, methods, and embodiments described in the present application may train machine learning models on large datasets of historical claims (e.g., approved claims, denied claims, etc.) across multiple payers to learn how various payers evaluate and respond to claims. By using machine learning to identify patterns and trends within these datasets, the machine learning models can understand payer-specific claim nuances and claim requirements, even when they are ambiguous or hidden. Accordingly, the systems, methods, and embodiments may use the machine learning models to compute the denial type and proposed claim modifications to overcome the claim denial. Thereby, increasing the likelihood of successful claim remediation and appeal.

Another technical advantage of the systems, methods, and embodiments described in this application includes the ability to accurately identify a denial type and/or the reasons behind a claim denial for each inbound denied claim. Typically, each payer has its own specific claim requirements, rules, and processes, which may not always be transparent, making it challenging to pinpoint the exact cause of a denial. However, such systems, methods, and embodiments may use machine learning models trained on large datasets of historical claims, including approved and/or denied claims, from multiple payers. These models may learn and detect payer-specific patterns and trends, payer-specific nuances, and other hidden complexities. By training the machine learning models (e.g., a single machine learning model, multiple machine learning models, or an ensemble of machine learning models) on such datasets, the machine learning models (e.g., the single machine learning model, the multiple machine learning models, or the ensemble of machine learning models) may interpret and/or decode ambiguous or opaque aspects of the payer's claim evaluation process to increase the likelihood of approval upon resubmission or appeal.

Another technical advantage of some of the systems, methods, and embodiments described in the present application may include the ability to present denied claim data and proposed modifications in an intuitive and user-friendly graphical user interface (GUI). The graphical user interface, in some embodiments, may display a plurality of distinct claim sections that include the corresponding claim data and any proposed claim modifications generated by the machine learning models for the given denied claim. Furthermore, the graphical user interface may visually emphasize (e.g., highlight, emphasize using color gradients, text bolding, etc.) specific sections (e.g., areas identified as the likely cause of the denial) of a subject claim that may require attention or changes based on the proposed claim modifications.

Another technical advantage of some of the systems, methods, and embodiments described in the present application may include the ability to automatically adapt a target digital claim based on receiving, via the graphical user interface, an input from the user selecting a claim adaptation object or the like that, when selected, implements the one or more proposed claim modifications that corresponds to the target digital claim. Accordingly, such systems, methods, and embodiments may automatically adapt the data structure underpinning the target digital claim to incorporate the one or more proposed claim modifications and, in real-time, update the visual representation of the target digital claim on the graphical user interface to reflect the adapted data structure.

Another technical advantage of some of the systems, methods, and embodiments described in the present application may include the ability to automatically re-file or transmit an adapted digital claim to the target entity. Upon incorporating the proposed claim modifications to a subject claim, such systems, methods, and embodiments may automatically submit, via a computer network, the adapted digital claim to a target entity for review without requiring manual intervention. Thereby, reducing delays in the claim resolution process and accelerating the re-filing process.

1. System for Clinical Note Data Classification and Machine Learning Inference(s)-Informed Automated Routing of Electronic Communications As shown in FIG. 1, a system 100 that implements clinical note data classification and uses machine learning inferences to inform an automated routing of electronic communications includes a clinical note data access and intake subsystem 110, feature extraction and classification subsystem 120, automated task generation subsystem 130, and an electronic communications subsystem 140.

1.05 Clinical Note Data Handling and Automated Electronic Communications Service The clinical note data handling and automated electronic communications service 105 implementing the system 100, sometimes referred to herein as the "clinical note handling service 105" may be implemented by a distributed network of computers (e.g., hosted on the cloud, etc.) and may be in operable and control communication with each of the subsystems of the system 100 and/or third-party subsystems and services. That is, the clinical note handling service 105 may include a centralized controlling computer server(s) and associated computing systems that encourages and/or controls the intelligent and accelerated clinical note data handling, clinical note data classification, and clinical note data-informed communications routing operations of each of the subsystems, described herein, (e.g., subsystems 110-140).

1.1 Clinical Note Data Access+Intake Subsystem

The clinical note data access and intake subsystem 110, which may be sometimes referred to herein as the "data access system" 110, preferably functions to enable one or more electronic connections between the system 100 and one or more external systems of one or more subscribers to the clinical note handling service 105. The data access subsystem 110 may include one or more access modules that may function to establish or create content communication channels, which are sometimes referred to as "data handling nexus", between the system 100 and systems associated with subscribers to the service 105. In one or more embodiments, the data handling nexus may include any suitable medium and/or method of transmitting digital items between at least two devices including, but not limited to, a service bus, a digital communication channel or line, and/or the like.

Additionally, or alternatively, the clinical note data access and intake subsystem 110 may provide a web-based graphical user interface or web application that may enable one or more subscribers to upload clinical note data (e.g., clinical note CSV files, and/or the like) directly into the system 100.

In one or more embodiments, based on accessing or receiving clinical note data, the data access system 110 may function to store the clinical note data in a queue and preferably generate and/or associate identifying metadata including, but not limited to, a session identifier providing a unique identification value for a clinical session associated with a target clinical note, a patient identifier, a doctor identifier, a clinical note identifier, and/or the like. In such embodiments, the identifying metadata may be passed along with the clinical note data to one or more downstream subsystems (e.g., subsystem 120, subsystem 130, subsystem 140) to enable processing, tracking, account identification, and/or the like.

In one or more embodiments, the clinical note data handling service 105 may function to implement a clinical note data handling application programming interface (API) that enables programmatic communication, access, and control between the system 100 and the one or more sub-services within the system 100 and one or more (third-party) APIs associated with one or more subscribers to the clinical note data handling service 105.

Additionally, or alternatively, the data access system 110 may receive the clinical notes data via a health level seven (HL7) interface. In such embodiments, an electronic health record (EHR) system associated with a subscriber may periodically or in real-time send one or more HL7 messages comprising clinical note data and/or other types of electronic health record (EHR) data to the data access system 110. In turn, the data access system 110 may receive the one or more HL7 messages via a secure channel (e.g., port) of the clinical note handling service 105 and provide the one or more HL7 messages to the NLP subsystem 120.

1.2 NLP: Feature Identification+Extraction and Classification Subsystem

The feature extraction and classification subsystem 120, which may sometimes be referred to herein as a "NLP subsystem", preferably functions to perform various natural language processing tasks including extracting features from clinical note data and computing one or more classification inferences and/or labels for each clinical note file being handled by the clinical note data handling service 105. The NLP subsystem 120 may additionally include one or more text processing modules and/or machine learning models that may tokenize textual data within a clinical note and vectorize and/or generate embeddings for each set of tokens and further cluster the tokens into semantically-related token groups or the like.

In one or more embodiments, the NLP subsystem 120 includes a machine learning module or subsystem that may be intelligently configured to predict various classifications for each clinical note document including, but not limited to, identifying whether a clinical note has a clinical recommendation, a number of clinical recommendations in a given clinical note, a type of clinical recommendation, a strength of a clinical recommendation, an urgency of a clinical recommendation, and/or the like. In such embodiments, the NLP subsystem 120 may include a plurality of distinct machine learning-based classification submodules, which may be outlined herein below in the method 200.

Additionally, or alternatively, in some embodiments, the NLP subsystem 120 may include extensible feature extraction and classification heuristics that may be applied alone or in combination with one or more machine learning-based classifiers described herein.

Additionally, or alternatively, the NLP subsystem 120 may implement one or more ensembles of pre-trained or trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.3 Automated Recommendation Task Generator

The automated recommendation handling task and instructions generator 130, which may be sometimes referred to herein as a "tasks generator" 130 or "automated task generation subsystem" 130, preferably functions to automatically generate a clinical recommendation registry including one or more tasks and/or one or more instructions for handling and/or disposing of clinical recommendations identified within a clinical note. In one or more embodiments, the task generator 130 may take in as input a set of extracted features and a set of classification inferences computed by the NLP subsystem 120 to compose and/or structure a given registry. It shall be noted that, in some portions of the disclosure, a "clinical recommendation registry" may be referred to as a "clinical recommendation worklist" or the like.

A given clinical recommendation registry preferably includes an enumeration of tasks and/or computer-executable instructions that may be automatically executed by the clinical note handling service 105. Additionally, or alternatively, the clinical recommendation registry may include patient session identifier (ID) data, clinical recommendation ID data, patient communications account data (e.g., email, phone number, messaging ID, etc.) that may be used as input in structuring one or more electronic communications to a given patient, as described herein and using at least e-communications arbiter 140.

Furthermore, in some embodiments, the task generator 130 may also be capable of ingesting additional electronic health record (EHR) data, such as appointment data, discharge data, transfer data, prescription data, and/or the like. This additional data may inform one or more operations of the task generator 130 and/or may be directly or indirectly provided as input to the e-communications arbiter 140 for structuring electronic communications to a given patient or other end users (e.g., a referring doctor, care team, etc.).

1.4 Automated E-Communications Arbiter & Routing

The electronic communications subsystem 140, which may be sometimes referred to herein as an "e-communications arbiter" 140, preferably functions to take in as input a clinical recommendation registry associated with a target clinical recommendation and structure, as output, an automated electronic communication scheme for handling and/or disposing of the target clinical recommendation. Accordingly, the e-communications arbiter 140 may function to intelligently select an optimal communication channel for communicating with an end user or patient, structuring communication parameters, such as a communication schedule and/or communication frequency and composing message content for each communication to the end user. In one or more embodiments, the e-communication arbiter may function to employ a selection matrix or the like for selecting a most optimal communication channel and may further employ pre-trained language models and/or messaging templates to compose messaging content for a given communication.

1.5 Denied Claim Routing Module

Figure 1A:
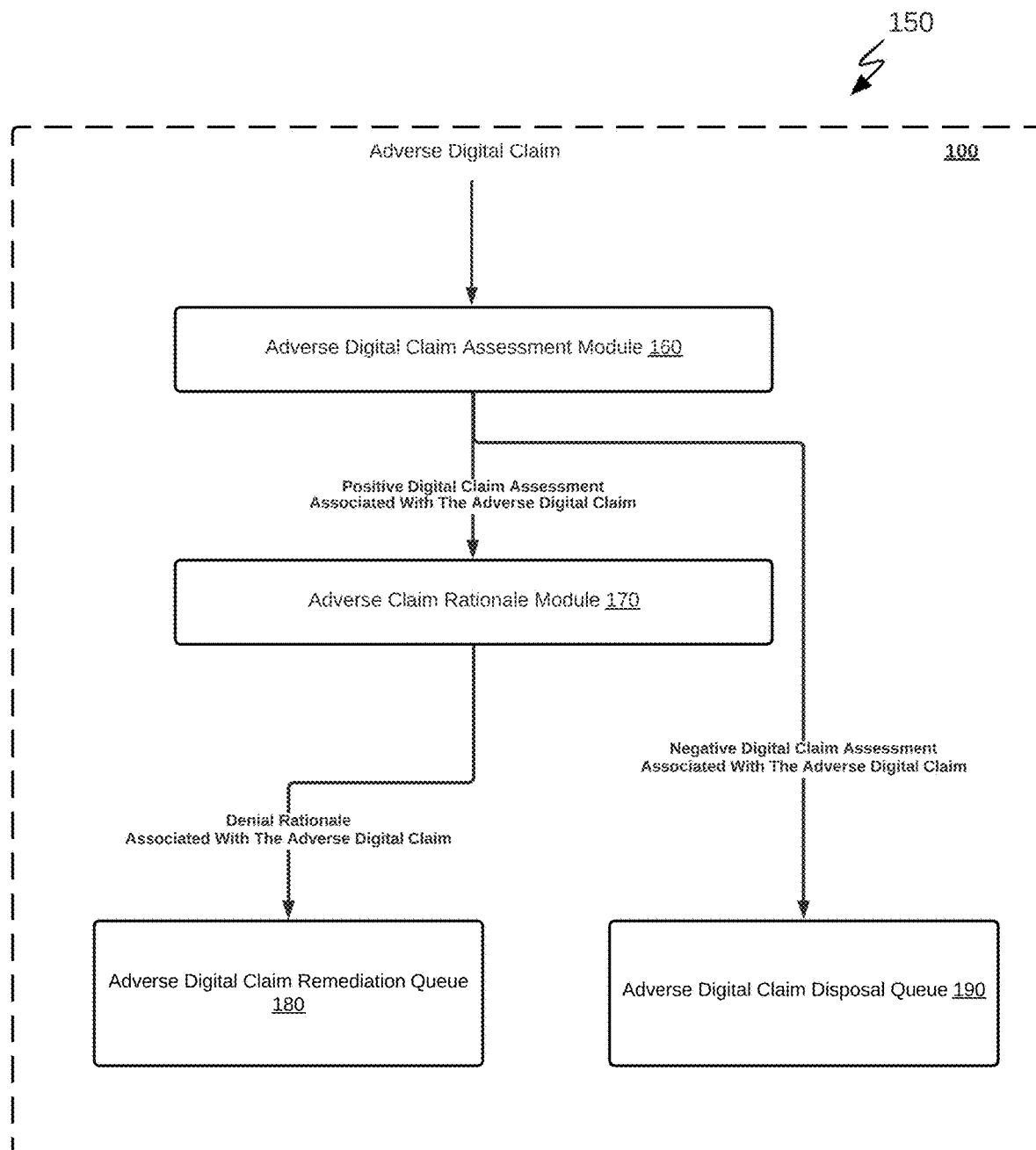
FIG. 1A illustrates a schematic representation of a subsystem of the system 100 in accordance with one or more embodiments of the present application.

As shown in FIG. 1A, a subsystem 150 (of the system 100) for intelligent routing of adverse digital claims may include an adverse digital claim assessment module 160, an adverse claim rationale module 170, an adverse digital claim remediation queue 180, and an adverse digital claim disposal queue 190. It shall be noted that the subsystem 150 may operate independently of the clinical note handling service 105 or in conjunction with the clinical note handling service 105.

The adverse digital claim assessment module 160 may function to receive adverse digital claim data associated with a target adverse digital claim and output an assessment that indicates whether the target adverse digital claim is likely to prevail during a claim appeal process.

Accordingly, in one or more embodiments, when the adverse digital claim assessment module 160 outputs a positive digital claim assessment for the target adverse digital claim, the subsystem 150 may function to route the target adverse digital claim to the adverse claim rationale module 170. The adverse claim rationale module 170 may function to generate an explainable reason or rationale that describes a likely reason why the target adverse digital claim was denied by the corresponding healthcare payer (e.g., the target entity). In one or more embodiments, based on the generating of the explainable reason or rationale, the subsystem 150 may function to route the target adverse digital claim to the adverse digital claim remediation queue 180.

Conversely, in one or more embodiments, when the adverse digital claim assessment module 160 outputs a negative digital claim assessment for the target adverse digital claim, the subsystem 150 may function to route the target adverse digital claim to the adverse digital claim disposal queue 190.

In one or more embodiments, a system or service may use the adverse digital claim assessment module 160 as a decision-making engine (e.g., automated decisioning service or the like). The adverse digital claim assessment module 160 may use one or more machine learning models (e.g., a single machine learning model, an ensemble of machine learning models, a plurality of machine learning models, the adverse claim assessment machine learning model described herein, etc.) to evaluate a likelihood of success for a claim appeal for a subject denied medical claim. For instance, in a non-limiting example, the adverse digital claim assessment module 160 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. In some embodiments, the adverse digital claim assessment module 160 may further employ any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, GPT-3.5, GPT-4, ELMo, content2Vec, and the like), an associated rule learning algorithm (e.g., an Apriori algorithm, an Eclat algorithm, etc.), a large language model (e.g., GPT, GPT-2, GPT-3, GPT-3.5, GPT-4, any suitable generative pretrained transformer model, and the like), a language model, an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm.

In one or more embodiments, a system or service may use the adverse claim rationale module 170 to identify a denial type of a subject denied medical claim, generate natural language explanations that explain a likely reason on why the subject denied medical claim was denied, and/or proposed claim modifications to the subject denied medical claim that, when implemented, increases the likelihood or probability of the subject denied medical claim being accepted (e.g., approved) upon resubmission. The adverse claim rationale module 170, in one or more embodiments, may use one or more machine learning models (e.g., a single machine learning model, an ensemble of machine learning models, a plurality of machine learning models, the adverse claim rationale machine learning model described herein, etc.). For instance, in a non-limiting example, the adverse claim rationale module 170 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. In some embodiments, the adverse digital claim assessment module 160 may further employ any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, GPT-3.5, GPT-4, ELMo, content2Vec, and the like), an associated rule learning algorithm (e.g., an Apriori algorithm, an Eclat algorithm, etc.), a large language model (e.g., GPT, GPT-2, GPT-3, GPT-3.5, GPT-4, any suitable generative pretrained transformer model, and the like), a language model, an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm.

Accordingly, in one or more embodiments, the subsystem 150 may route a subject denied medical claim or the like to the adverse digital claim remediation queue 180 or the adverse digital claim disposal queue 190 based on machine learning-based inferences generated or computed by the adverse digital claim assessment module 160 and/or the adverse claim rationale module 170 (e.g., when the adverse digital claim assessment module 160 determines that a subject denied claim has a low likelihood or probability of success upon appeal, the subsystem 150 may route the subject denied claim to the adverse digital claim disposal queue 180 (e.g., a disposition queue) to prevent unnecessary use of resources on claims unlikely to be reversed, etc.).

2. Method for Machine Learning-Based Routing of Adverse Digital Claims

As shown in FIG. 2, the method 200 for machine learning-based routing of adverse digital claims may include configuring an adverse claim assessment machine learning model and an adverse claim rationale machine learning model (S210), obtaining adverse digital claim data associated with a subject adverse digital claim (S220), generating an adverse digital claim assessment inference based on the subject adverse digital claim (S230), generating an adverse claim rationale inference based on the subject adverse digital claim (S240), and routing the subject adverse digital claim (S250).

Figure 3:
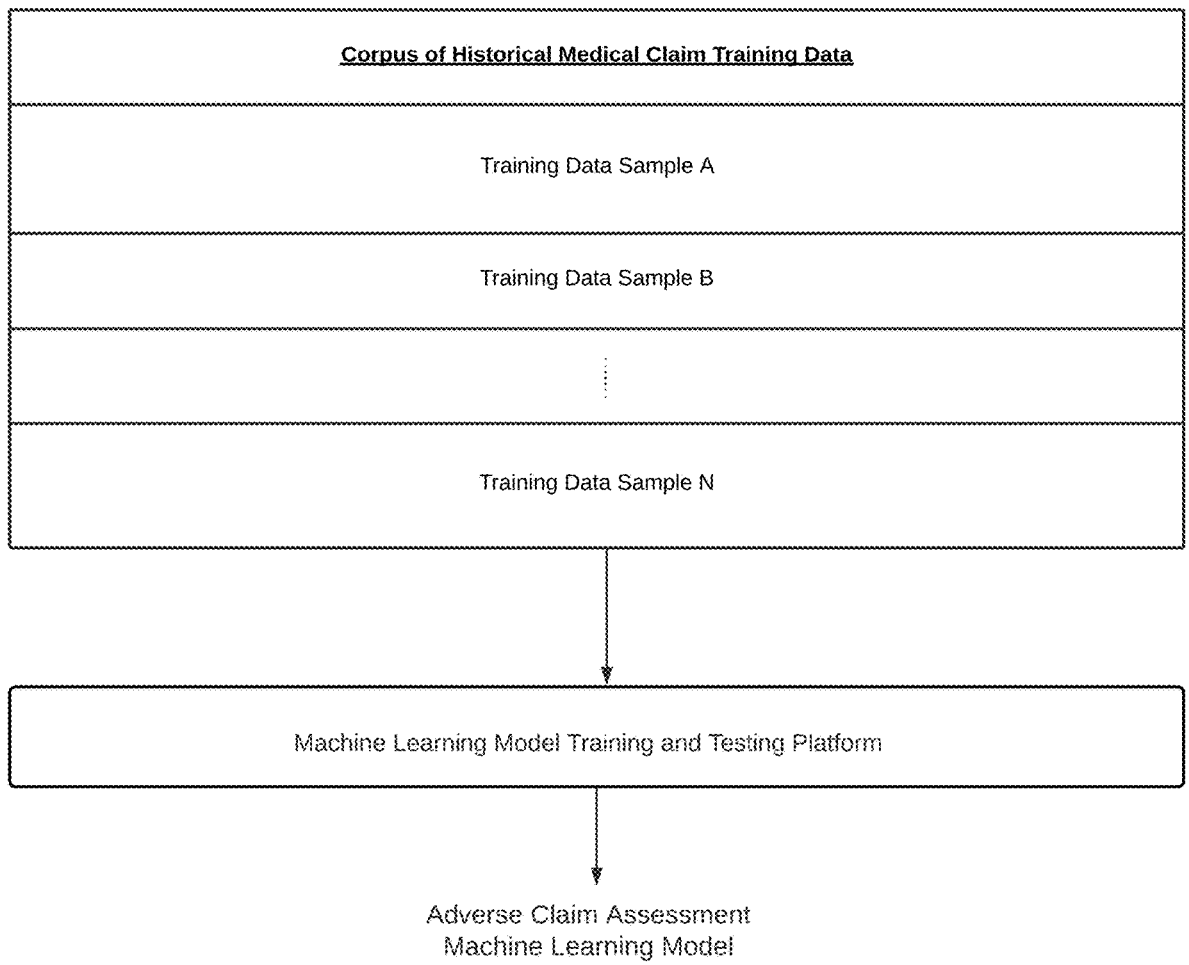
FIG. 3 illustrates an example schematic of generating an adverse claim assessment machine learning model in accordance with one or more embodiments of the present application.
Figure 4:
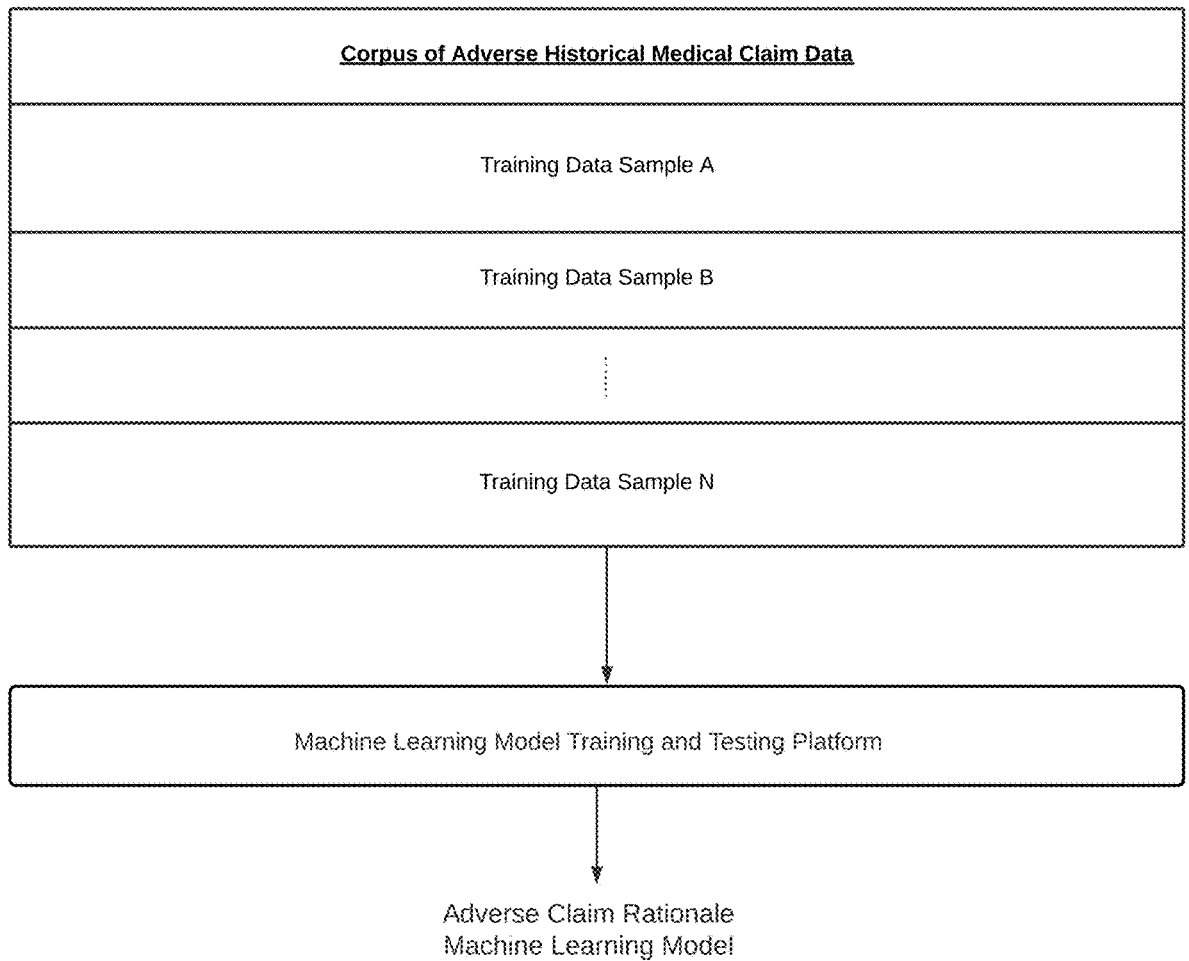
FIG. 4 illustrates an example schematic of generating an adverse claim rationale machine learning model in accordance with one or more embodiments of the present application.

2.1 Configuring an Adverse Claim Assessment Machine Learning Model and an Adverse Claim Rationale Machine Learning Model S210, which includes configuring an adverse claim assessment machine learning model and an adverse claim rationale machine learning model, may function to configure and/or generate the adverse claim assessment machine learning model and the adverse claim rationale machine learning model using any suitable machine learning model training and testing platform, as shown generally by way of example in FIG. 3 and FIG. 4.

Generating the Adverse Claim Assessment Machine Learning Model

In one or more embodiments, a system or service implementing method 200 may function to generate the adverse claim assessment machine learning model based on a model training of any suitable machine learning classification model.

As described in more detail herein, in one or more embodiments, the adverse claim assessment machine learning model, when trained, may function to generate an adverse digital claim assessment inference that may indicate a likelihood of prevailing or successfully resolving a subject adverse digital claim (i.e., a denial of a subject claim). For instance, in a non-limiting example, based on the adverse claim assessment machine learning model receiving, as input, adverse digital claim data associated with a subject adverse digital claim, the adverse claim assessment machine learning model may function to generate an adverse digital claim assessment inference that indicates the subject adverse digital claim is likely to prevail and/or be successfully resolved during a claim appeal process. Additionally, or alternatively, in such a non-limiting example, based on the adverse claim assessment machine learning model receiving, as input, adverse digital claim data associated with a target adverse digital claim, the adverse claim assessment machine learning model may function to generate an adverse digital claim assessment inference that indicates the target adverse digital claim is unlikely to prevail during a claim appeal process.

In one or more embodiments, the adverse claim assessment machine learning model may be generated based on a training of a target machine learning classification model using one or more corpora of historical medical claim data, as shown generally by way of example in FIG. 3. It shall be noted that, in one or more embodiments, the one or more corpora of historical medical claim data may include a plurality of labeled training data samples that collectively represent a variety of medical claim scenarios and medical claim outcomes.

Stated another way, in one or more embodiments, each distinct labeled training data sample of the plurality of labeled training data samples may include a variety of feature data and attribute data (e.g., data associated with the type of medical services provided, medical diagnosis data, healthcare provider data, claim outcome data, health insurance payer data, etc.) that corresponds to a distinct historical medical claim. Accordingly, in such embodiments, the target machine learning classification model (e.g., the adverse claim assessment machine learning model) may use a set of learned weights and biases (generated from the training) to accurately predict likely claim response actions for inbound denied medical claims (e.g., adverse digital claims).

In one or more embodiments, a system or service implementing method 200 may function to obtain a corpus of labeled sequential training data samples. In such an embodiment, each labeled sequential training data sample may include an initial version (e.g., original claim or the like) of a medical claim that was denied by a subject entity, one or more distinct resubmissions of the medical claim in which each distinct resubmission of the medical claim includes at least one claim modification over a previous submission associated with the medical claim, and a corresponding outcome label for each distinct resubmission that indicates whether a subject resubmission was approved or denied by the subject entity. Accordingly, in one or more embodiments, the system or service implementing method 200 may function to configure the adverse claim assessment machine learning model (e.g., claim assessment machine learning model or the like) based on a training of a target machine learning model using the corpus of labeled sequential training data samples.

Stated differently, in one or more embodiments, the system or service implementing method 200 may function to source, via one or more processors, one or more corpora of labeled training data samples. Each distinct labeled training data sample of the one or more corpora of labeled training data samples, in one or more embodiments, may include an initial representation of an original claim having an adverse decision (e.g., denied claim) and a corresponding classification label, one or more unique resubmission representations of the corresponding claim and a corresponding outcome label that indicates whether the subject resubmission was approved or denied. Accordingly, in one or more embodiments, the system or service implementing method 200 may configure the adverse claim assessment machine learning model by training one or more machine learning models (e.g., one machine learning model, an ensemble of machine learning models, etc.) using the one or more corpora of labeled training data samples.

In this way, the trained claim assessment machine learning model may learn the progression of changes made to medical claims, the outcomes associated with each claim modification, and/or the outcomes (e.g., approval or denial) associated with each claim submission. Furthermore, by training one or more machine learning models using the above-mentioned training data samples, the one or more machine learning models may learn patterns and relationships between claim submissions and their corresponding approval or denial outcomes, which may allow the one or more machine learning models to predict the likelihood of claim success, as described in more detail herein.

As mentioned above, in one or more embodiments, the claim assessment machine learning model may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. In some embodiments, the claim assessment machine learning model may further employ any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, GPT-3.5, GPT-4, ELMo, content2Vec, and the like), an associated rule learning algorithm (e.g., an Apriori algorithm, an Eclat algorithm, etc.), a large language model (e.g., GPT, GPT-2, GPT-3, GPT-3.5, GPT-4, any suitable generative pretrained transformer model, and the like), a language model, an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm.

It shall be noted that, in one or more embodiments, the claim assessment machine learning model (e.g., adverse claim assessment machine learning model or the like) may undergo continuous retraining to improve an inferential accuracy of the claim assessment machine learning model. For example, if the claim assessment machine learning model incorrectly predicts that a subject medical claim is likely to be approved but, in fact, the subject medical claim was denied by the target entity, the claim assessment machine learning model may be retrained using the claim data associated with the subject medical claim and the corresponding ground truth classification label (e.g., claim denial classification label). Such retraining may be used for other claims (e.g., tens or hundreds of claims) where the claim assessment machine learning model made similar incorrect predictions, allowing the claim assessment machine learning model to adjust its internal parameters (e.g., weights and biases) and better identify patterns that contribute to claim denials. By leveraging such claims, the claim assessment machine learning model may enhance its ability to predict future claim outcomes more accurately.

Generating the Adverse Claim Rationale Machine Learning Model

In one or more embodiments, a system or service implementing method 200 may function to generate the adverse claim rationale machine learning model based on a model training of any suitable machine learning model.

As described in more detail herein, in one or more embodiments, the adverse claim rationale machine learning model, when trained, may function to generate an adverse claim rationale inference that may indicate a denial type and/or denial reason associated with a subject adverse digital claim (e.g., a digital claim having an adverse decision). For instance, in a non-limiting example, based on the adverse claim rationale machine learning model receiving, as input, adverse digital claim data of a subject adverse digital claim, the adverse claim rationale machine learning model may function to generate an adverse claim rationale inference that includes a likely denial type (and/or denial reason) associated with the subject adverse digital claim.

In one or more embodiments, the adverse claim rationale machine learning model may be generated based on a training of a target machine learning model using one or more corpora of adverse historical medical claim data, as shown generally by way of example in FIG. 4. It shall be noted that, in one or more embodiments, each distinct training data sample included in the one or more corpora of adverse historical medical claim data may include a variety of feature data and attribute data (e.g., data associated with the type of medical services provided, medical diagnosis data, healthcare provider data, claim outcome data, health insurance payer data, etc.) of a subject adverse historical medical claim and/or a corresponding denial type or reason label associated with the subject adverse historical medical claim.

Accordingly, in such embodiments, the target machine learning model (e.g., adverse claim rationale machine learning model) may use a set of learned weights and biases (generated from the training) to accurately predict a likely denial type or reason for inbound denied medical claims (e.g., adverse digital claims).

In one or more embodiments, a system or service implementing method 200 may function to obtain a corpus of labeled training data samples. Each distinct labeled training data sample of the corpus of labeled training data samples, in one or more embodiments, may include a distinct historical medical claim, a corresponding denial type label, and a corresponding set of features of the distinct medical claim indicative of the corresponding denial type label. Accordingly, in such an embodiment, the system or service implementing method 200 may function to configure the adverse claim rationale machine learning model based on a training of a target machine learning classification model using the corpus of labeled training data samples.

As mentioned above, in one or more embodiments, the adverse claim rationale machine learning model may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. In some embodiments, the adverse claim rationale machine learning model may further employ any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, GPT-3.5, GPT-4, ELMo, content2Vec, and the like), an associated rule learning algorithm (e.g., an Apriori algorithm, an Eclat algorithm, etc.), a large language model (e.g., GPT, GPT-2, GPT-3, GPT-3.5, GPT-4, any suitable generative pretrained transformer model, and the like), a language model, an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm.

Additionally, or alternatively, in one or more embodiments, a system or service implementing method 200 may function to obtain a corpus of labeled sequential training data samples. In such an embodiment, each labeled sequential training data sample may include an initial version (e.g., an original medical claim or the like) of a medical claim that was denied by a subject entity and one or more distinct resubmissions of the medical claim. Each distinct resubmission, in one or more embodiments, may include at least one modification over the previous submission of the same claim. Additionally, in one or more embodiments, distinct each training data sample may include a corresponding denial type label, a corresponding denial reason label, and/or a corresponding claim outcome for the initial version of the claim and for each resubmission. Accordingly, in one or more embodiments, the system or service implementing method 200 may configure the adverse claim rationale machine learning model (e.g., denial type machine learning classification model) based on a training of a target machine learning model using the corpus of labeled sequential training data samples.

Stated differently, in one or more embodiments, the system or service implementing method 200 may function to source, via one or more processors, one or more corpora of labeled training data samples. Each distinct labeled training data sample of the one or more corpora may include an initial representation of a denied medical claim, along with a corresponding denial type or reason label, and one or more unique resubmission representations of the same claim, having its corresponding denial type or reason label. Accordingly, in one or more embodiments, the system or service implementing method 200 may configure the adverse claim rationale machine learning model (e.g., denial type machine learning classification model) by training one or more machine learning models (e.g., one machine learning model, an ensemble of machine learning models, etc.) using the one or more corpora of labeled training data samples.

In this way, the trained adverse claim rationale machine learning model (e.g., the trained denial type machine learning classification model) may learn the progression of changes made to medical claims, the specific denial types or denial reasons, and/or the corresponding denial outcomes for each claim submission. By training one or more machine learning models using the above-mentioned training data samples, the machine learning model(s) may learn patterns and relationships between claim modifications and their corresponding denial types or reasons. This may enable the machine learning model(s) to accurately predict the likely denial type or denial reason for each inbound denied medical claim and/or identify the most effective changes or modifications to each inbound denied medical claims to increase the probability of approval during resubmissions or appeal processes, as described in more detail herein.

It shall be noted that, in one or more embodiments, the adverse claim rationale machine learning model (e.g., denial type machine learning classification model) may undergo continuous retraining to improve an inferential accuracy of the adverse claim rationale machine learning model. For example, if the adverse claim rationale machine learning model incorrectly predicts the denial rationale and/or suggests an incorrect modification for a subject medical claim, the adverse claim rationale machine learning model may be retrained using the claim data associated with the subject medical claim and one or more corresponding ground truth labels (e.g., correct denial type, reason and/or rationale). Such retraining may be used for other claims (e.g., tens or hundreds of claims) where the adverse claim rationale machine learning model made similar incorrect predictions, allowing the adverse claim rationale machine learning model to adjust its internal parameters (e.g., weights and biases) and better recognize patterns that contribute to specific denial reasons. By leveraging such claims, the adverse claim rationale machine learning model may enhance its ability to predict denial rationales (or types) and predict more accurate claim remediation actions.

2.2 Obtaining Adverse Digital Claim Data

S220, which includes obtaining adverse digital claim data, may function to obtain adverse digital claim data associated with a subject adverse digital claim. An adverse digital claim, as generally referred to herein, may be a digital claim (e.g., medical claim, etc.) that has been denied or rejected by a target entity (e.g., insurance provider, healthcare payer, etc.) based on a determination that the digital claim fails to comply with one or more claim processing procedures of the target entity. It shall be recognized that the phrase "adverse digital claim data" may be interchangeably referred to herein as "digital claim data", "claim data", or the like.

In one or more embodiments, each adverse digital claim detected by the system or service implementing method 200, may be electronically routed and digitally stored in an adverse claim queue associated with a target subscriber. That is, in one or more embodiments, a subject adverse digital claim associated with a first subscriber may be electronically routed and stored in an adverse claim queue associated with the first subscriber and a subject adverse digital claim associated with a second subscriber may be electronically routed and stored in an adverse claim queue associated with the second subscriber. Stated another way, in one or more embodiments, each distinct subscriber to the system or service implementing method 200 may have a corresponding adverse claim queue that includes a plurality of adverse digital claims of the subject subscriber.

It shall be recognized that, in one or more embodiments, each distinct adverse digital claim electronically stored in an adverse claim queue may include a plurality of distinct pieces of adverse claim data. The plurality of distinct pieces of adverse claim data, in one or more embodiments, may relate to patient data (e.g., a patient identification number, a patient last name, a patient first name, etc.), medical insurance data (e.g., medical insurance type, medical insurance plan, medical insurance provider, etc.), a visit number, a charge amount, a denial reason or code, a date of service, a procedure code, a diagnosis code, an associated medical practitioner providing the services, a referring physician, and/or the like.

Figure 5:
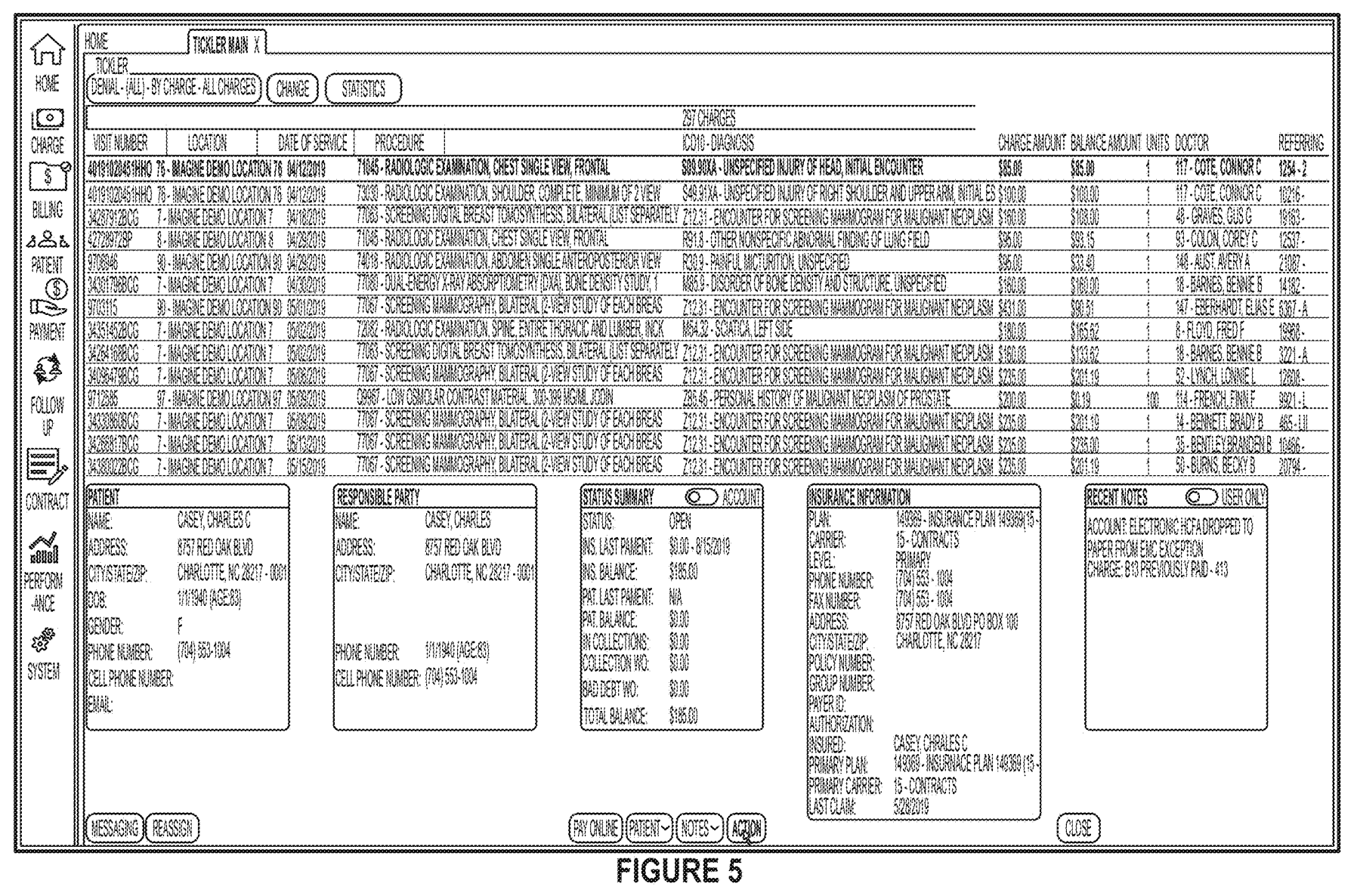

It shall be noted that, in one or more embodiments, a representation of an adverse claim queue of a subject subscriber may be electronically displayed on an adverse claim assessment graphical user interface or the like, as shown generally by way of example in FIG. 5. The adverse claim assessment graphical user interface, in one or more embodiments, may be implemented via any suitable computing device including, but not limited to, a mobile computing device, a personal computing device, a web-browser (having a website displayed therein), and/or any system having a suitable interface for implementing the method 200. It shall be further noted that, in one or more embodiments, the adverse claim assessment graphical user interface may function to display adverse digital claims according to one or more claim prioritization criteria (e.g., a claim amount at-risk, by date, or the like).

Accordingly, in one or more embodiments, S220 may function to source or obtain, from an adverse claim queue, adverse digital claim data of a target adverse digital claim and, in turn, use the adverse digital claim data in one or more downstream operations, as described in more detail herein. In such embodiments, S220 may function to identify the target adverse digital claim based on (or in response to) the target adverse digital claim being added to the adverse claim queue within a predetermined temporal threshold, based on (or in response to) receiving one or more user inputs via the adverse claim assessment graphical user interface that is directed to one or more selectable representations associated with the target adverse digital claim, based on (or in response to) receiving an application programming interface request, and/or the like.

For instance, in a non-limiting example, S220 may function to obtain, from a computer database, claim data associated with a digital claim that has an adverse decision (e.g., denial). In another non-limiting example, S220 may function to obtain, from a computer database, medical claim data associated with a medical claim that was denied by a target entity.

2.3 Generating an Adverse Digital Claim Assessment Inference

S230, which includes generating an adverse digital claim assessment inference, may function to generate an adverse digital claim assessment inference using the adverse claim assessment machine learning model. In one or more embodiments, the adverse claim assessment machine learning model, when applied to adverse digital claim data of a target adverse digital claim, may function to generate an adverse digital claim assessment inference that indicates a likelihood of prevailing or successfully resolving the target adverse digital claim during a claim appeal process and/or the like. It shall be recognized that the phrase "adverse digital claim assessment inference" may be interchangeably referred to herein as an "adverse claim assessment inference", "a claim assessment inference," and/or the like.

In one or more embodiments, a system or service implementing method 200 may function to compute, using the adverse claim assessment machine learning model (e.g., claim assessment machine learning model), an adverse digital claim assessment inference (e.g., claim assessment inference) based on one or more corpora of feature vectors extracted from claim data associated with a subject digital claim that has an adverse decision. The claim assessment inference, in one or more embodiments, may include a likelihood (e.g., claim dispute score, etc.) of the adverse decision being reversed for the subject digital claim.

For instance, in a non-limiting example, a system or service implementing method 200 may function to compute, using the adverse claim assessment machine learning model (e.g., claim assessment machine learning model), an adverse digital claim assessment inference (e.g., claim assessment inference) based on one or more corpora of feature vectors extracted from medical claim data associated with a subject medical claim that was denied by a target entity. The claim assessment inference, in one or more embodiments, may include a likelihood (e.g., claim dispute score, etc.) of the medical claim being approved by the target entity on appeal.

Feature Extraction

In one or more embodiments, S230 may function to implement a feature extractor or a feature extractor system that may function to extract a feature dataset (e.g., a corpus of adverse digital claim features) from a target adverse digital claim. In such embodiments, the feature extractor or the feature extractor system may function to extract, from a subject adverse digital claim, a plurality of adverse digital claim features that, in turn, may be provided, as model input, to the adverse claim assessment machine learning model. It shall be noted that, in some embodiments, the extracted features may encompass various data types, including, but not limited to, categorical data, continuous data, discrete data, and/or textual data associated with a target adverse digital claim.

For instance, in a non-limiting example, the extracted adverse digital claim features may include, but not limited to, patient data, medical insurance data, medical diagnosis data, healthcare provider data, claim denial data, and any other suitable features associated with a subject adverse digital claim. It shall be recognized that, in such embodiments, the extracted adverse digital claim features may provide a comprehensive representation of the subject adverse digital claim. Thereby, enabling the adverse claim assessment machine learning model to generate accurate adverse digital claim assessment inferences. It shall be noted that, in one or more embodiments, S230 may function to extract any distinct piece of claim data that corresponds to the subject adverse digital claim shown in FIG. 5 and FIGS. 8-12 and, in turn, use the extracted piece of claim data as a feature for input to the adverse claim assessment machine learning model to assist with computing claim assessment inferences.

Stated another way, in one or more embodiments, a subset of the plurality of adverse digital claim features extracted from a subject adverse digital claim may include patient data.

Additionally, or alternatively, in one or more embodiments, a subset of the plurality of adverse digital claim features extracted from the subject adverse digital claim may include medical insurance data (e.g., the type of insurance plan, the insurance provider, etc.).

Additionally, or alternatively, in one or more embodiments, a subset of the plurality of adverse digital claim features extracted from the subject adverse digital claim may include medical diagnosis data.

Additionally, or alternatively, in one or more embodiments, a subset of the plurality of adverse digital claim features extracted from the subject adverse digital claim may include healthcare provider data.

Additionally, or alternatively, in one or more embodiments, a subset of the plurality of adverse digital claim features extracted from the subject adverse digital claim may include claim denial data (e.g., a specific reason or reasons for the denial or adverse decision associated with the subject adverse digital claim).

It shall be recognized that, in one or more embodiments, each extracted feature may be used to assist the claim assessment machine learning model with computing the likelihood of the adverse decisioning being reversed for a subject digital claim (e.g., the likelihood of the medical claim being approved on appeal). It shall be further noted, in one or more embodiments, S230 may function to process the above-mentioned data to create a set of features for analysis by the claim assessment machine learning model. This may include aggregating data over one or more time intervals (e.g., hourly, daily, etc.) to create one or more time series-based features, extracting information from claim data, such as messages or other claim indicators, transforming categorical data into numerical feature representations, and/or the like.

Additionally, or alternatively, in one or more embodiments, S230 may function extract, using one or more feature extractors, one or more corpora of feature vectors from claim data associated with a subject denied claim. In such an embodiment, extracting the one or more corpora of feature vectors may include extracting a first corpus of feature vectors that includes feature data associated with a target entity that issued the adverse decision for the subject denied claim and extracting a second corpus of feature vectors that includes feature data associated with the subject denied claim. In other words, the first corpus of feature vectors may represent entity-specific factors, such as the decision-making patterns, policies, and/or denial tendencies of the target entity, while the second corpus represents claim-specific factors, such as the nature of the medical services, medical diagnosis, and/or patient details.

At least one technical benefit of extracting the first corpus of feature vectors and the second corpus of feature vectors may include increasing the inferential accuracy of the adverse claim assessment machine learning model by enabling the adverse claim assessment machine learning model to assess and predict outcomes based on entity-specific factors and claim-specific factors.

Adverse Digital Claim Assessment Inference Generation

In one or more embodiments, using the adverse claim assessment machine learning model, S230 may function to compute an adverse digital claim assessment inference for a target adverse digital claim based on the corpus of adverse digital claim features (e.g., feature dataset) that corresponds to the target adverse digital claim. In one or more embodiments, S230 may function to compute, via the adverse claim assessment machine learning model, a distinct adverse digital claim assessment inference for each distinct adverse digital claim obtained by S220.

In one or more embodiments, based on receiving a feature dataset or corpus of adverse digital claim features associated with a subject adverse digital claim, the adverse claim assessment machine learning model may function to generate an adverse digital claim assessment inference that indicates the likelihood of prevailing or successfully resolving the subject adverse digital claim during a claim appeal process and/or the like.

In a first implementation of such embodiments, the adverse digital claim assessment inference may include an adverse claim dispute score. The adverse claim dispute score, in one or more embodiments, may relate to a likely signal strength or probability of likelihood of prevailing against a subject adverse digital claim to which the adverse digital claim assessment inference corresponds. For instance, in a non-limiting example, the adverse claim dispute score computed for a target adverse digital claim may be a numerical value within a predetermined score range (e.g., zero (0) and one (1), zero (0) and one hundred (100), etc.) in which a higher adverse claim dispute score (e.g., ninety (90), ninety-five (95), etc.) indicates a higher likelihood of successfully converting an adverse digital claim (e.g., a denied claim or the like) to an approved claim (e.g., paid claim, a settled claim, or the like) during a claim appeal process and vice versa.

In one or more embodiments of such a first implementation, based on extracting a first corpus of feature vectors that includes feature data indicative of a target entity that issued an adverse decision for a subject denied claim and extracting a second corpus of feature vectors that includes feature data indicative of the subject denied claim, S230 may function to compute, using a claim assessment machine learning model, a claim assessment inference in response to the claim assessment machine learning model receiving the first corpus of feature vectors and the second corpus of feature vectors. The claim assessment inference, in one or more embodiments, may include a likelihood of the adverse decision being reversed for the subject denied claim.

Additionally, or alternatively, in a second implementation of such embodiments, the adverse digital claim assessment inference may include a binary-based classification label. The binary-based classification label, in one or more embodiments, may predict (or forecast) a probable result (or outcome) of a claim appeal that has not yet been filed for a subject adverse digital claim to which the adverse digital claim assessment inference corresponds. For instance, in a non-limiting example, the binary-based classification label computed for a target adverse digital claim may relate to a positive classification label (e.g., the medical services performed were medically necessary, the denied claim is likely to be overturned, etc.) that predicts that the yet-to-be filed claim appeal for the target adverse digital claim is likely to be successful. Conversely, in such a non-limiting example, the binary-based classification label computed for a target adverse digital claim may relate to a negative classification label (e.g., the medical services performed were not medically necessary, the denied claim is not likely to be overturned, etc.) that predicts that the yet-to-be filed claim appeal for the target adverse digital claim is unlikely to be successful.

In another non-limiting example, a system or service implementing method 200 may function to identify, via one or more processors, a new medical claim that has not been filed with a target entity (e.g., target payer or the like). In such a non-limiting example, using the claim assessment machine learning model, S230 may function to compute a claim assessment inference for the new medical claim that predicts a probability of approval if the new medical claim were to be filed with the target entity. Accordingly, in one or more embodiments of such a non-limiting example, the probability of approval of the new medical claim may fail to satisfy the predetermined minimum claim approval threshold.

Furthermore, in such an embodiment, the system or service implementing method 200 may function to identify or detect, via one or more processors, an attempt by a user to electronically transmit, via a computer network or the like, the new medical claim to the target entity and, in turn, in response to identifying the attempt to electronically transmit the new medical claim to the target entity, the system or service implementing method 200 may function to prevent a submission (e.g., transmission) of the new medical claim based on identifying that the probability of approval of the new medical claim fails to satisfy the predetermined minimum claim approval threshold and/or surface, via a graphical user interface, a notification that informs the user the new medical claim is unlikely to be approved by the target entity. It shall be recognized that, in one or more embodiments, the notification may include a message indicating that the probability of approval that corresponds to the new medical claim is below the predetermined minimum claim approval threshold, an explanation of one or more likely factors contributing to the probability of approval of the new medical claim being below the predetermined minimum claim approval threshold, and/or one or more proposed claim remediation actions (e.g., one or more modifications or changes) for the new medical that, if implemented, increases a likelihood that the new medical claim is approved by the target entity.

Additionally, or alternatively, in one or more embodiments, the system or service implementing method 200 may function to persistently present or surface, via graphical user interface element, a claim approval probability or score on a graphical user interface (GUI) while a user is creating or modifying a medical claim. Using the claim assessment machine learning model, S230 may compute and continuously display a real-time probability of approval as the user enters or updates claim data for the corresponding claim. The graphical user interface element displaying the claim approval probability, or score may be dynamically updated to match a real-time state of the corresponding claim.

Furthermore, in one or more embodiments, once the claim approval probability or score meets or exceeds a predetermined minimum claim approval threshold, the system or service may automatically remove the graphical user interface element displaying the claim approval probability or score. This may indicate to a user that the claim has reached a high likelihood of approval, and no further modifications are necessary to meet the predetermined minimum claim approval threshold. It shall be recognized, in one or more embodiments, prior to the claim approval probability or score satisfying the predetermined minimum claim approval threshold, the system or service may provide real-time feedback or suggestions (e.g., one or more proposed claim modifications) to improve the claim's likelihood of approval, as described in more detail herein.

Fast Routing of Adverse Digital Claims

Figure 6:
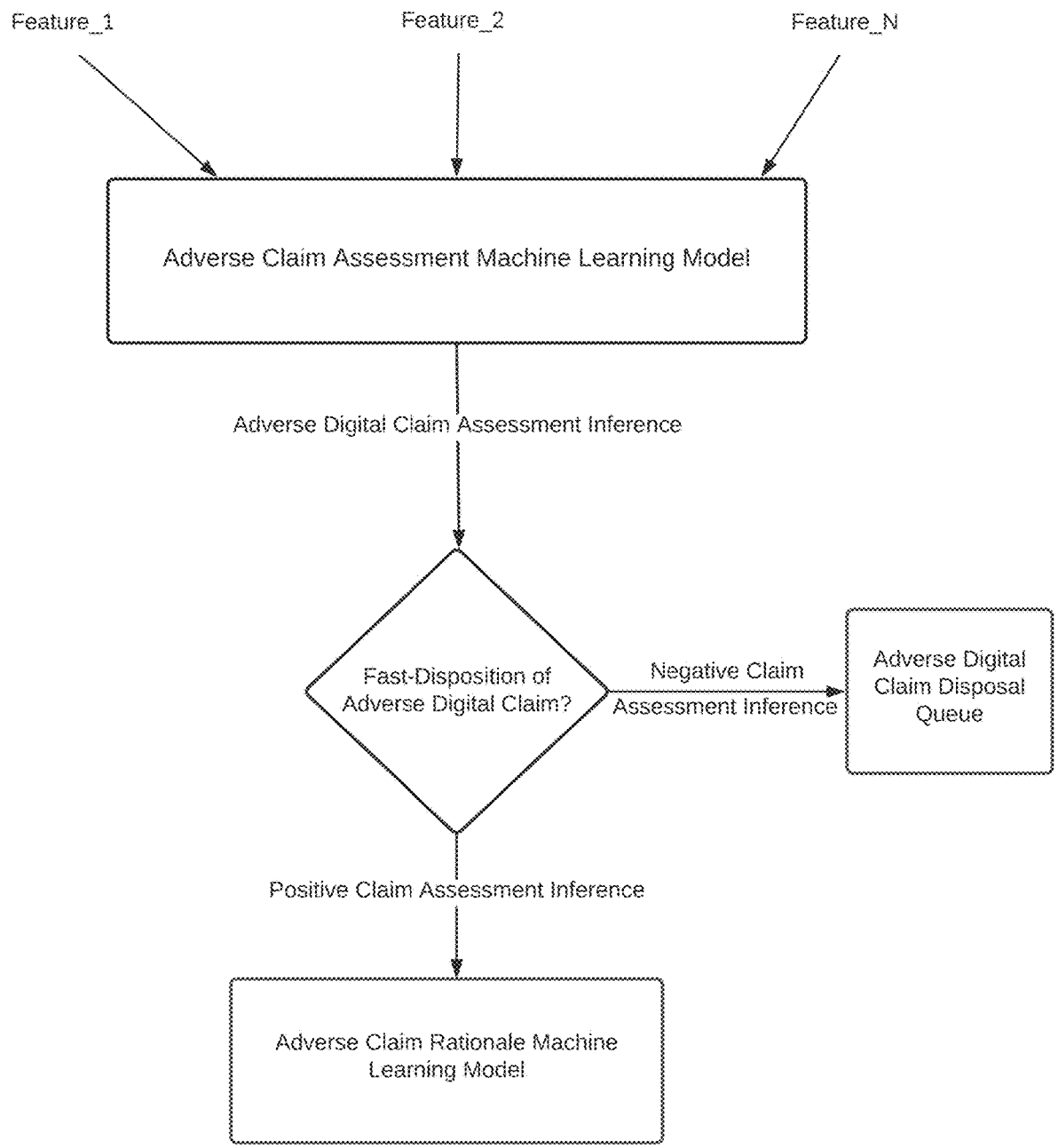
FIG. 6 illustrates an example schematic of using an adverse claim assessment machine learning model in accordance with one or more embodiments of the present application.

It shall be recognized that, in one or more embodiments, based on S230 generating an adverse digital claim assessment inference for a subject adverse digital claim, a system or service implementing method 200 may function to route the subject adverse digital claim to one of a plurality of claim handling queues. For instance, in a non-limiting example, based on the adverse claim assessment machine learning model generating an adverse digital claim assessment inference for a target adverse digital claim that indicates a low likelihood of a successful claim appeal, the target adverse digital claim may be routed to a claim disposal queue or a claim review queue, as shown generally by way of example in FIG. 6. Conversely, in a non-limiting example, based on the adverse claim assessment machine learning model generating an adverse digital claim assessment inference for a target adverse digital claim that indicates a high likelihood of a successful claim appeal, the target adverse digital claim may be routed to a downstream machine learning model (e.g., the adverse claim rationale machine learning model) for further analysis and processing, as shown generally by way of example in FIG. 6.

Stated another way, in one or more embodiments, a system or service implementing method 200 may function to automatically route a subject digital claim to a target claim handling queue of a plurality of distinct claim handling queues based on the likelihood of the adverse decision being reversed for the digital claim. For instance, in a non-limiting example, the subject digital claim may be routed to a digital claim review queue when the likelihood of the adverse decision being reversed for the subject digital claim fails to satisfy a predetermined minimum threshold. In another non-limiting example, the subject digital claim may be routed to a digital claim remediation queue when the likelihood of the adverse decision being reversed for the subject digital claim satisfies the predetermined minimum threshold.

Additionally, or alternatively, in one or more embodiments, a claim assessment inference computed for a subject denied medical claim may include an adverse claim dispute score. The adverse claim dispute score, in one or more embodiments, may indicate the likelihood of the subject denied medical claim being approved by the target entity on appeal. In one or more embodiments, the subject denied medical claim may be routed to a claim review queue when the adverse claim dispute score that corresponds to the subject denied medical claim fails to satisfy a predetermined minimum claim approval threshold. In another embodiment, the subject denied medical claim may be routed to a claim remediation queue when the adverse claim dispute score that corresponds to the subject denied medical claim satisfies the predetermined minimum claim approval threshold.

At least one technical benefit of generating the adverse digital claim assessment inference may lead to more efficient allocation of resources, as adverse digital claims with a higher likelihood of success may be prioritized over adverse digital claims with a lower likelihood of success. Additionally, S230 may prevent subscribers from preparing and/or filling claim appeals for adverse digital claims that are predicted to have a low likelihood of success.

2.4 Generating an Adverse Claim Rationale Inference

S240, which includes generating an adverse claim rationale inference, may function to generate an adverse claim rationale inference using the adverse claim rationale machine learning model. In one or more embodiments, the adverse claim rationale machine learning model may function to generate an adverse claim rationale inference that may indicate a denial type and/or denial reason associated with a subject adverse digital claim. It shall be recognized that the phrase "adverse claim rationale inference" may be interchangeably referred to herein as a "claim rejection rationale", a "denial reason inference", and/or the like.

In one or more embodiments, based on S240 receiving a subject adverse digital claim that is predicted (by S230) to be likely converted from a denied claim to an approved claim (e.g., paid claim, a settled claim, or the like), the adverse claim rationale machine learning model may function to generate an adverse claim rationale inference that includes a denial decoding or denial translation of (e.g., generic) claim denial data provided by the target entity (e.g., the payer) for declining the subject adverse digital claim.

It shall be recognized that, in many embodiments, the (e.g., generic) claim denial data provided by the target entity (e.g., the payer) for declining a subject adverse digital claim may not be clear, understandable, and/or usable. Thus, in one or more embodiments, the adverse claim rationale machine learning model, through the generation of an adverse claim rationale inference, may be capable of decoding or translating the (e.g., generic) claim denial data into explainable or understandable claim denial data.

For instance, in a non-limiting example, based on or in response to S240 obtaining a subject adverse digital claim that is predicted (by S230) to be likely converted to an approved claim (e.g., paid claim, a settled claim, or the like), S240 may function to extract a claim rationale feature dataset from the subject adverse digital claim. In such a non-limiting example, the claim rationale feature dataset may include, but not limited to, a distinct feature that corresponds to the target entity (e.g., the payer or the like) associated with the subject adverse digital claim, a distinct feature that corresponds to the medical diagnosis included within the subject adverse digital claim, a distinct feature that corresponds to the medical services specified within the subject adverse digital claim, and/or a distinct feature that corresponds to the (e.g., generic) claim denial data defined within the subject adverse digital claim. It shall be noted that, in one or more embodiments, S240 may function to extract any distinct piece of claim data that corresponds to the subject adverse digital claim shown in FIG. 5 and FIGS. 8-12 and, in turn, use the extracted piece of claim data as a feature for input to the adverse claim rationale machine learning model to assist with computing claim rationale inference (e.g., claim denial rationale inferences or the like).

Accordingly, in such a non-limiting example, the claim rationale feature dataset may be provided, as input, to the adverse claim rationale machine learning model that, in turn, may output a distinct adverse claim rationale inference that includes an explainable denial reason or set of denial rationales for the denial of the subject adverse digital claim. It shall be further noted, in one or more embodiments, the adverse claim rationale machine learning model (e.g., the denial type machine learning classification model, etc.) may further function to predict or output a set of proposed claim modifications for the subject adverse digital claim, as described in more detail herein. A proposed claim modification, as generally referred to herein, may be a system or service proposed recommendation or adjustment (e.g., replace current value "X" with proposed value "Y", etc.) to a subject claim to correct a likely error or omission that contributed to a denial of the subject claim.

Stated another way, in one or more embodiments, the adverse claim rationale machine learning model (e.g., the denial type machine learning classification model, etc.) may function to receive a claim rationale feature dataset that defines that a target adverse digital claim is associated with payer "X", medical diagnosis type "Y", performed medical services "A", "B", and "C", and claim denial data (e.g., payer-provided denial reason) that describes that "this claim lacks information or has submission/billing errors which is needed for adjudication". Accordingly, in such a non-limiting example, the adverse claim rationale machine learning model (e.g., the denial type machine learning classification model, etc.) may function to generate, for the target adverse digital claim, a distinct adverse claim rationale inference that includes an explainable reason for the denial of the target adverse digital claim, such as, payer "X" does not pay for medical services "B" for medical-screening related services.

Additionally, or alternatively, in another non-limiting example, the adverse claim rationale machine learning model may function to receive a claim rationale feature dataset that defines that a target adverse digital claim is associated with payer "X", medical diagnosis code "A", medical procedure code "Z" and (e.g., generic) claim denial data that explains that "this claim lacks information or has submission/billing errors which is needed for adjudication". Accordingly, in such a non-limiting example, the adverse claim rationale machine learning model may function to generate, for the target adverse digital claim, a distinct adverse claim rationale inference that includes an explainable reason for the denial of the target adverse digital claim, such as, payer "X" prefers or requires the use of NCCI PTP-associated modifier "G" over the currently used modifiers.

Additionally, or alternatively, in another non-limiting example, the adverse claim rationale machine learning model may function to receive a claim rationale feature dataset that represents a target adverse digital claim. Accordingly, in such a non-limiting example, the adverse claim rationale machine learning model may function to generate, for the target adverse digital claim, a distinct adverse claim rationale inference that includes an explainable reason for the denial of the target adverse digital claim, such as, modifiers need to be updated for this visit and look into the "location" feature for this claim.

In one or more embodiments, based on determining, via one or more processors, that the likelihood of a subject denied medical claim satisfies the predetermined minimum claim approval threshold, the system or service implementing method 200 may function to extract, using the one or more feature extractors, a second corpus of feature vectors from medical claim data associated with the subject denied medical claim. The second corpus of feature vectors, in one or more embodiments, may include feature data indicative of a likely denial type of the subject denied medical claim. Accordingly, in one or more embodiments, using a denial type machine learning classification model (e.g., the adverse claim rationale machine learning model), the system or service may function to compute a denial-type classification inference that includes a denial-type associated with the subject denied medical claim based on the denial type machine learning classification model receiving the second corpus of feature vectors.

For instance, in a non-limiting example, the denial type machine learning classification model (e.g., the adverse claim rationale machine learning model) may function to receive one or more corpora of feature vectors that represents a denied claim. Accordingly, the denial type machine learning classification model may function to compute, for the denied claim, a denial-type classification inference that predicts the denial type or class of the denied claim from a plurality of predetermined denial types or classes. In such a non-limiting example, the denial type machine learning classification model may predict that the denied claim corresponds to a modifiers-related denial class (e.g., the denial type machine learning classification model may predict that a medical code or modifier was either omitted or incorrectly applied, resulting in the likely denial of a subject claim due to improper modifier usage), as shown generally by way of example in FIG. 8.

In another non-limiting example, the denial type machine learning classification model (e.g., the adverse claim rationale machine learning model) may function to receive one or more corpora of feature vectors that represent a denied claim. Accordingly, the denial type machine learning classification model may function to compute, for the denied claim, a denial-type classification inference that predicts the denial type or class of the denied claim from a plurality of predetermined denial types or classes. In such a non-limiting example, the denial type machine learning classification model may predict that the denied claim corresponds to a coding-related denial class (e.g., the denial type machine learning classification model may predict that a mismatch exists between the diagnosis and procedure codes submitted, resulting in the likely denial of a subject claim due to incorrect medical coding), as shown generally by way of example in FIG. 8.

In another non-limiting example, the denial type machine learning classification model (e.g., the adverse claim rationale machine learning model) may function to receive one or more corpora of feature vectors that represent a denied claim. Accordingly, the denial type machine learning classification model may function to compute, for the denied claim, a denial-type classification inference that predicts the denial type or class of the denied claim from a plurality of predetermined denial types or classes. In such a non-limiting example, the denial type machine learning classification model may predict that the denied claim corresponds to a reasons-related denial class (e.g., the denial type machine learning classification model may predict that the medical services provided does not meet medical necessity criteria or other payer-specific requirements, resulting in the likely denial of a subject claim due to insufficient justification or non-compliance with guidelines), as shown generally by way of example in FIG. 8.

In another non-limiting example, the denial type machine learning classification model (e.g., the adverse claim rationale machine learning model) may function to receive one or more corpora of feature vectors that represent a denied claim. Accordingly, the denial type machine learning classification model may function to compute, for the denied claim, a denial-type classification inference that predicts the denial type or class of the denied claim from a plurality of predetermined denial types or classes. In such a non-limiting example, the denial type machine learning classification model may predict that the denied claim corresponds to a pending information denial class (e.g., the denial type machine learning classification model may predict claim information is incomplete or missing, resulting in the likely denial of a subject claim due to insufficient information), as shown generally by way of example in FIG. 8.

Stated another way, in one or more embodiments, a system or service implementing method 200 may function to use one or more machine learning models (e.g., one or more machine learning models downstream of the claim assessment machine learning model, the denial type machine learning classification model, the adverse claim rationale machine learning model, or the like) to compute, for a subject denied claim, a likely claim denial type and one or more proposed claim modification to correct likely defects within subject denied claim.

2.5 Adverse Digital Claim Routing

S250, which includes adverse digital claim routing, may function to route a subject adverse digital claim to one of a plurality adverse claim remediation queues. In one or more embodiments, S250 may function route a subject adverse digital claim to one of a plurality of adverse claim remediation queues based on the adverse claim rationale inference computed for the subject adverse digital claim.

Figure 7:
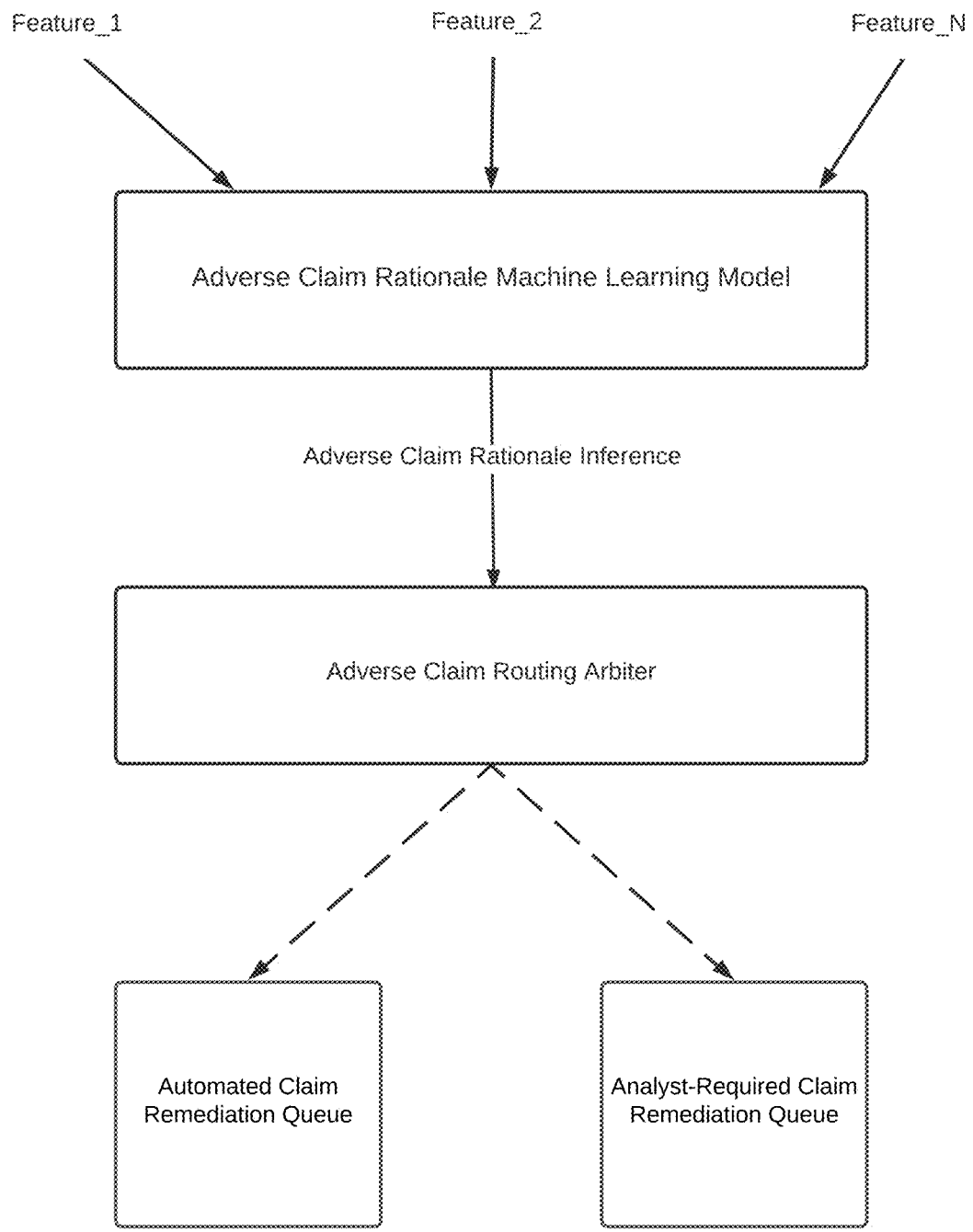
FIG. 7 illustrates an example schematic of using an adverse claim rationale machine learning model in accordance with one or more embodiments of the present application.

In one or more embodiments, S250 may function to route a subject adverse digital claim to an automated claim remediation queue when the adverse claim rationale inference that corresponds to a subject adverse digital claim includes a denial reason or denial type that is automatically modifiable, automatically fixable, automatically repairable, and/or the like by the system or service implementing the method 200, as shown generally by way of example in FIG. 7. Accordingly, based on a routing of the subject adverse digital claim to the automated claim remediation queue, the system or service may function to automatically apply claim remediation or modification actions to the subject adverse digital claim, as described in U.S. Patent Application No. 63/615,642, filed 28 Dec. 2023, titled SYSTEMS AND METHODS FOR AUTOMATED REMEDIATION OF DENIED MEDICAL CLAIMS, which is incorporated herein in its entirety by this reference. Such automated remediation actions may include, but are not limited to, correcting likely errors in the claim data, updating missing or incomplete information, and/or re-submitting the claim with the appropriate modifications.

For instance, in a non-limiting example, when a subject denied claim is identified to have an incorrect modifier (using one or more of the above-mentioned machine learning models), a system or service implementing method 200 may function to automatically correct the subject denied claim by replacing the incorrect modifier with the correct modifier and, in turn, resubmit the claim for approval.

In another non-limiting example, when a subject denied claim is identified to be missing patient information such as an absent date of birth (using one or more of the above-mentioned machine learning models), the system or service implementing method 200 may automatically query the hospital's electronic health records (EHR) for the missing data. Once retrieved, the system or service may automatically update the subject denied claim with the correct date of birth for the patient and, in turn, resubmit the claim for approval.

In another non-limiting example, when a subject denied claim is identified to have an issue related to one or more service-specific details (e.g., service location, NPI identifier, referring provider, date of service, etc.) using one or more of the above-mentioned machine learning models, the system or service implementing method 200 may automatically assess the disputed information against the healthcare provider's verified records. Once the correct data is identified, whether it be the service location, the NPI identifier, the referring provider, the date of service, the system or service may automatically update the subject denied claim with the correct data (or information) and, in turn, resubmit the claim for approval.

In one or more embodiments, when the system or service implementing method 200 identifies that a subject denied claim is automatically repairable by the system or service, the system or service may function to automatically adapt the subject denied claim to an adapted claim. In such embodiments, automatically adapting the subject denied claim to the adapted claim may include modifying one or more elements or values within a claim data structure that corresponds to the subject denied claim. Stated another way, the system or service may function to automatically adjust or modify claim data associated with the subject denied claim to correct likely errors, likely omissions, or likely defects without manual intervention.

In one or more embodiments, S250 may function to route a subject adverse digital claim to an analyst-required claim remediation queue when the adverse claim rationale inference that corresponds to a subject adverse digital claim includes a denial reason or denial type that is not automatically modifiable, not automatically fixable, not automatically repairable, and/or the like by the system or service implementing the method 200, as shown generally by way of example in FIG. 7. Stated another way, the denial reason or denial type of the subject adverse digital claim is likely of a type (or reason) that requires an analyst to augment and/or modify the claim data associated with the subject adverse digital claim.

In one or more embodiments, a system or service implementing method 200 may function to obtain, from a computer database, claim data associated with a digital claim that has an adverse decision and, in turn, extract, using one or more feature extractors, one or more corpora of feature vectors from the claim data associated with the digital claim. Extracting the one or more corpora of feature vectors, in one or more embodiments, may include extracting a first corpus of feature vectors that includes feature data associated with a target entity that issued the adverse decision and extracting a second corpus of feature vectors that includes feature data associated with the digital claim.

Furthermore, in one or more embodiments, the system or service implementing method 200 may further function to compute, using a claim assessment machine learning model, a claim assessment inference based on the claim assessment machine learning model receiving the one or more corpora of feature vectors. The claim assessment inference, in one or more embodiments, may include a likelihood of the adverse decision being reversed for the digital claim. Accordingly, in response to computing the likelihood of the adverse decision being reversed for the digital claim, the system or service may function to automatically route the digital claim to a target claim handling queue of a plurality of distinct claim handling queues based on the likelihood of the adverse decision being reversed for the digital claim. In such embodiments, the digital claim may be routed to one of a digital claim review queue when the likelihood of the adverse decision being reversed for the digital claim fails to satisfy a predetermined minimum threshold and a digital claim remediation queue when the likelihood of the adverse decision being reversed for the digital claim satisfies the predetermined minimum threshold.

In one or more embodiments, the claim assessment inference may include a claim dispute score that indicates the likelihood of the adverse decision being reversed for the digital claim and the claim dispute score satisfies the predetermined minimum threshold. Accordingly, when the claim dispute score satisfies the predetermined minimum threshold, the system or service implementing method 200 may function to extract, using the one or more feature extractors, a second corpus of feature vectors from the claim data associated with the digital claim, wherein the second corpus of feature vectors includes feature data indicative of a likely denial type or a likely denial reason of the digital claim and, in turn, compute, using one or more downstream machine learning models, a likely claim denial type of the digital claim and one or more proposed claim modifications to the digital claim based on the likely claim denial type (e.g., a first machine learning model (or machine learning-based system) to predict the likely claim denial type, a second machine learning model (or machine learning-based system) to predict the one or more proposed claim modifications, or the same machine learning model (or machine learning-based system) to predict the likely claim denial type and the one or more proposed claim modifications).

Additionally, or alternatively, in one or more embodiments, the system or service implementing method 200 may further function to determine or identify whether the likely claim denial type of the digital claim and the one or more proposed claim modifications to the digital claim satisfies automated claim remediation criteria. Automated claim remediation criteria, in one or more embodiments, may be satisfied when the likely claim denial type of the digital claim and the one or more proposed claim modifications to the digital claim matches or corresponds to an automatically fixable denial type of a plurality of automatically fixable denial types defined by the system or service and/or the one or more proposed claim modifications to the digital claim can be automatically implemented or executed by the system or service. It shall be noted that, in one or more embodiments, the system or service may function to determine if automated remediation criteria is satisfied by assessing the likely claim denial type of the digital claim and the one or more proposed claim modifications to the digital claim against a database that includes automatable denial types and automatable claim correction or modification actions.

Accordingly, in one or more embodiments, the system or service implementing method 200 may function to automatically adapt the digital claim to an adapted digital claim based on the likely claim denial type of the digital claim and the one or more proposed claim modifications satisfying the automated claim remediation criteria. Automatically adapting the digital claim to the adapted digital claim, in one or more embodiments, may include automatically adjusting one or more portions or one or more sections of the digital claim based on the one or more proposed claim modifications and automatically transmitting, via a computer network, the adapted digital claim to the target entity that issued the adverse decision.

Conversely, in one or more embodiments, the system or service implementing method 200 may function to identify or detect the likely claim denial type of the digital claim and the one or more proposed claim modifications to the digital claim fails to satisfy the automated claim remediation criteria and, in turn, bypass an automatic adaptation of the digital claim based on identifying the likely claim denial type of the digital claim and the one or more proposed claim modifications to the digital claim fails to satisfy the automated claim remediation criteria. Furthermore, in some embodiments, the system or service may function to display, via a graphical user interface, a representation of the digital claim that includes a plurality of distinct claim sections that includes the claim data and the one or more proposed claim modifications to the digital claim, as shown generally by way of example in FIG. 9. Additionally, in some embodiments, the graphical user interface may function to visually emphasize (e.g., highlight using different color gradients, etc.) a selective subset of claim sections of the plurality of distinct claim sections that map to the one or more proposed claim modifications to graphically indicate to a user where likely claim changes are needed within the digital claim, as shown generally by way of example in FIG. 9 and FIG. 10.

Additionally, or alternatively, in one or more embodiments, the system or service may function to further receive, via the graphical user interface, an input from the user selecting a claim adaptation control element of the graphical user interface and, in turn, in response to receiving the input from the user selecting the claim adaptation control element, automatically adapting a data structure underpinning the digital claim to incorporate the one or more proposed claim modifications and updating, in real-time, the representation of the digital claim to correspond to the adapted data structure. It shall be recognized, in such an embodiment, the one of the one or more proposed claim modifications may correspond to correcting one or more portions of the data structure underpinning the digital claim to satisfy claim requirements of the target entity.

In one or more embodiments, a system or service may function to obtain, from a computer database, medical claim data associated with a medical claim that was denied by a target entity and, in turn, extract using one or more feature extractors, one or more corpora of feature vectors from the medical claim data associated with the medical claim. The one or more corpora of feature vectors, in one or more embodiments, may include a first corpus of feature vectors that includes feature data associated with the target entity and a second corpus of feature vectors that includes feature data associated with the medical claim.

Accordingly, in one or more embodiments, the system or service may function to compute, using a claim assessment machine learning model, a claim assessment inference based on the claim assessment machine learning model receiving the one or more corpora of feature vectors. The claim assessment inference, in one or more embodiments, may include a likelihood of the medical claim being approved by the target entity on appeal. Furthermore, in some embodiments, the system or service may function to automatically route the medical claim to a claim review queue when the likelihood of the medical claim being approved on appeal fails to satisfy a predetermined minimum claim approval threshold or automatically route the medical claim to a claim remediation queue when the likelihood of the medical claim being approved on appeal satisfies the predetermined minimum claim approval threshold.

Accordingly, in one or more embodiments, the likelihood of the medical claim being approved on appeal satisfies the predetermined minimum claim approval threshold and in response to determining, via one or more processors, the likelihood of the medical claim being approved on appeal satisfies the predetermined minimum claim approval threshold, the system or service implementing method 200 may function to further extract, using the one or more feature extractors, a second corpus of feature vectors from the medical claim data associated with the medical claim that includes feature data indicative of a likely denial type or a likely denial reason of the medical claim denied by the target entity and compute, using a denial type machine learning classification model, a denial-type classification inference based on the denial type machine learning classification model receiving the second corpus of feature vectors. The denial-type classification inference, in one or more embodiments, may include a denial-type associated with the medical claim denied by the target entity.

It shall be noted that, in one or more embodiments, the system or service may function to implement a multi-stage denied claim classification and remediation pipeline. The first stage of the multi-stage denied claim classification and remediation pipeline may include the computing, by the claim assessment machine learning model, the claim assessment inference, the second stage of the multi-stage denied claim classification and remediation pipeline includes the computing, by the denial type machine learning classification model, the denial-type classification inference, and the third stage of the multi-stage denied claim classification and remediation pipeline includes executing one or more claim remediation actions based on the denial-type classification inference. For instance, in a non-limiting example, executing the one or more automated claim remediation actions may include automatically adapting the medical claim to an adapted medical claim that corrects one or more defects in the medical claim, and automatically re-submitting the adapted medical claim to the target entity for evaluation.

It shall be further recognized, in one or more embodiments, the medical claim data associated with the medical claim may include a denial reason code or message from the target entity. The denial reason code or message (e.g., payer-provided denial message or code), in such an embodiment, may be insufficient for determining an exact reason that the target entity denied the medical claim. Accordingly, in one or more embodiments, the denial type machine learning classification model may be configured to decode or translate the denial reason code or message provided by the target entity into an explainable denial type that identifies likely defective areas or elements within a subject denied medical claim.

Additionally, or alternatively, in one or more embodiments, the system or service may further function to automatically assess, via the one or more processors, the denial-type computed for the medical claim by the denial type machine learning classification model against automated claim remediation criteria and, in turn, identify the denial-type computed for the medical claim satisfies at least one automated claim remediation criterion of the automated claim remediation criteria. Accordingly, in such a non-limiting example, the system or service may further function to automatically adapt, via the one or more processors, the medical claim to an adapted medical claim by automatically correcting one or more defective sections or one or more defective portions of the medical claim based on the denial-type classification inference and automatically transmit, via the one or more processors, the adapted medical claim to the target entity for review in response to correcting the one or more defective sections or the one or more defective portions of the medical claim.

It shall be further recognized, in one or more embodiments, the denial-type classification inference may further include a proposed change to the medical claim that, when implemented, may increase a probability of the medical claim being approved by the target entity on appeal. The confidence score of the denial-type classification inference, in some embodiments, may fail to satisfy an automated claim remediation threshold. Accordingly, in embodiments in which the confidence score of the denial-type classification inference fails to the automated claim remediation threshold, the system or service implementing method 200 may further function to display, via a graphical user interface, a representation of the medical claim and the proposed change to the medical claim in natural language.

Figure 11:

In one or more embodiments, while displaying the graphical user interface, the system or service may function to receive a first user input selecting a claim correction button of the graphical user interface and, in turn, in response to receiving the first user input selecting the claim correction button, displaying a claim adjustment proposal user interface that presents a current set of values (e.g., one or more current values, two or more current values, three or more current values) of the medical claim identified to be defective by the denial-type classification inference and the proposed change(s) to the one or more current values (e.g., the proposed change(s) were computed by one or more of the above-mentioned machine learning models), as shown generally by way of example in FIG. 11 and FIG. 12. For instance, in a non-limiting example, the claim adjustment proposal user interface may present a current value of the medical claim identified to be defective by the denial-type classification inference and the proposed change to the current value, wherein the proposed change includes a proposed value. Furthermore, in such a non-limiting example, the system or service implementing method 200 may function to automatically implement the proposed change to the medical claim by replacing the current value with the proposed value in response to receiving a second user input selecting an automated claim remediation button of the claim adjustment proposal user interface, and, in turn, automatically transmit the medical claim that includes the proposed value to the target entity.

It shall be recognized that, in some embodiments, the current value of the medical claim and the proposed value may be displayed side-by-side or in-line with one another on the claim adjustment proposal user interface.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

I claim:

1. A computer-implemented system method comprising:
    one or more processors;
    a memory; and
    a computer-readable medium operably coupled to the one or more processors, the computer-readable medium having computer-readable instructions stored thereon that, when executed by the one or more processors, cause a computing device to perform operations comprising:
        sourcing, via the one or more processors, a corpus of labeled training data samples, wherein each distinct labeled training data sample of the corpus of labeled training data samples includes a claim submission sequence that includes an original representation of a respective claim that was denied by a subject entity and a resubmission representation of the respective claim that was approved by the subject entity, wherein the original representation of the respective claim is attributed a denied claim classification label and the resubmission representation of the respective claim is attributed an approved claim classification label;
        training a claim assessment machine learning model using the corpus of labeled training data samples;
        obtaining, from a computer database, claim data associated with a digital claim that has an adverse decision;
        extracting, using one or more feature extractors, one or more corpora of feature vectors from the claim data associated with the digital claim, wherein extracting the one or more corpora of feature vectors includes:
            (i) extracting a first corpus of feature vectors that includes feature data associated with a target entity that issued the adverse decision, and
            (ii) extracting a second corpus of feature vectors that includes feature data associated with the digital claim;
        computing, using the claim assessment machine learning model, a claim assessment inference based on the claim assessment machine learning model receiving the one or more corpora of feature vectors, wherein the claim assessment inference includes a likelihood of the adverse decision being reversed for the digital claim;
        automatically routing the digital claim to a digital claim disposal queue when the claim assessment inference corresponds to a negative claim assessment inference, wherein automatically routing the digital claim to the digital claim disposal queue prevents compute resources of the computer-implemented system being used on the digital claim;
        routing the digital claim to an adverse claim rationale machine learning model when the claim assessment inference corresponds to a positive claim assessment inference, wherein the digital claim includes a generic denial reason provided by the target entity that is insufficient for determining an exact reason that the target entity issued the adverse decision for the digital claim; and
        when the digital claim is routed to the adverse claim rationale machine learning model:
            predicting, using the adverse claim rationale machine learning model, a claim denial type that corresponds to the digital claim from a plurality of predetermined claim denial types,
            predicting, using the adverse claim rationale machine learning model, one or more proposed claim modifications to correct one or more defects in the digital claim;
            automatically adapting the digital claim to an adapted digital claim by adjusting a data structure underpinning the digital claim based on the one or more proposed claim modifications when the digital claim satisfies automated claim remediation criteria; and
            automatically transmitting, via a computer network, the adapted digital claim to the target entity.

2. The computer-implemented system method according to claim 1, wherein:
    the claim assessment inference includes a claim dispute score that indicates the likelihood of the adverse decision being reversed for the digital claim,
    the claim assessment inference corresponds to the positive claim assessment inference when the claim dispute score satisfies a predetermined minimum threshold,
    the claim dispute score satisfies the predetermined minimum threshold,
    the computer-implemented system further includes extracting, using the one or more feature extractors, a third corpus of feature vectors from the claim data associated with the digital claim, wherein the third corpus of feature vectors includes feature data indicative of a likely denial type or a likely denial reason of the digital claim, and
    the adverse claim rationale machine learning model predicts the claim denial type of the digital claim and the one or more proposed claim modifications to the digital claim in response to providing the third corpus of feature vectors as input to the adverse claim rationale machine learning model.

3. The computer-implemented system according to claim 1, wherein:
the claim assessment inference corresponds to the positive claim assessment inference,
the adverse claim rationale machine learning model further predicts the digital claim is missing a target piece of patient data,
the computer-implemented system further includes retrieving the target piece of patient data missing in the digital claim by automatically querying an electronic health record system for the target piece of patient data,
automatically adapting the digital claim to the adapted digital claim includes automatically modifying the data structure to include the target piece of patient data retrieved from the electronic health record system, and
the adapted digital claim automatically transmitted to the target entity includes the target piece of patient data retrieved from the electronic health record system.

4. The computer-implemented system according to claim 1, further comprising:
identifying the digital claim fails to satisfy the automated claim remediation criteria,
bypassing the automatic adaptation of the digital claim based on identifying the digital claim fails to satisfy the automated claim remediation criteria, and
displaying, via a graphical user interface, a representation of the digital claim, wherein the graphical user interface includes:
(i) a plurality of distinct claim sections that includes the claim data, and
(ii) the one or more proposed claim modifications to the digital claim.

5. The computer-implemented system according to claim 4, further comprising:
visually emphasizing, on the graphical user interface, a selective subset of claim sections of the plurality of distinct claim sections that map to the one or more proposed claim modifications, wherein visually emphasizing the selective subset of claim sections indicates to a user where likely claim changes are needed within the digital claim.

6. The computer-implemented system according to claim 5, further comprising:
receiving, via the graphical user interface, an input from the user selecting a claim adaptation control element of the graphical user interface,
in response to receiving the input from the user selecting the claim adaptation control element, automatically adapting the data structure underpinning the digital claim to incorporate the one or more proposed claim modifications, and
updating, in real-time, the representation of the digital claim to correspond to the adapted data structure.

7. The computer-implemented system according to claim 6, wherein:
one of the one or more proposed claim modifications corresponds to correcting one or more portions of the data structure underpinning the digital claim to satisfy claim requirements of the target entity,
the claim requirements of the target entity are not published nor made publicly available by the target entity, and
the claim requirements of the target entity are learned by the adverse claim rationale machine learning model based on training the adverse claim rationale machine learning model on historical claim data involving the target entity.

8. The computer-implemented system according to claim 1, wherein:
a first feature of the second corpus of feature vectors represents a diagnosis code included in the digital claim,
a second feature of the second corpus of feature vectors represents a procedure code included in the digital claim, and
the claim assessment machine learning model uses the first feature of the second corpus of feature vectors and the second feature of the second corpus of feature vectors to assist with computing the likelihood of the adverse decision being reversed for the digital claim.

9. The computer-implemented system according to claim 1, further comprising:
continuously retraining the claim assessment machine learning model to adjust weights and biases of the claim assessment machine learning model based on the claim assessment machine learning model predicting that a subject claim is to be approved but the subject claim was actually denied, wherein continuously retraining the claim assessment machine learning model includes using claim data of the subject claim to retrain the claim assessment machine learning model.

10. The computer-implemented system according to claim 1, wherein:
the one or more proposed claim modifications predicted by the adverse claim rationale machine learning model includes replacing a current modifier data value included in the digital claim with a different modifier data value required by the target entity,
automatically adapting the digital claim to the adapted digital claim by adjusting the data structure underpinning the digital claim includes replacing the current modifier data value included in the data structure of the digital claim with the different modifier data value required by the target entity, and
the adapted digital claim automatically transmitted to the target entity includes the different modifier data value.

11. The computer-implemented system according to claim 1, wherein:
the claim assessment inference corresponds to the positive claim assessment inference,
the adverse claim rationale machine learning model further predicts that the digital claim is missing a target type of data,
the computer-implemented system further includes retrieving a data value that corresponds to the target type of data by automatically querying a data repository for the data value,
automatically adapting the digital claim to the adapted digital claim includes automatically modifying the data structure underpinning the digital claim to include the data value retrieved from the data repository, and
the adapted digital claim automatically transmitted to the target entity includes the data value retrieved from the data repository.

12. The computer-implemented system according to claim 1, wherein:
the claim assessment inference corresponds to the negative claim assessment inference, and
automatically routing the digital claim to the digital claim disposal queue prevents the compute resources of the computer-implemented system being used on the digital claim by bypassing a routing of the digital claim to the adverse claim rationale machine learning model based on the claim assessment inference corresponding to the negative claim assessment inference.

13. A computer-program product comprising a non-transitory machine-readable storage medium storing computer instructions that, when executed by one or more processors, perform operations comprising:
obtaining, from a computer database, medical claim data associated with a medical claim that was denied by a target entity;
extracting, using one or more feature extractors, one or more corpora of feature vectors from the medical claim data associated with the medical claim, wherein extracting the one or more corpora of feature vectors includes:
(i) extracting a first corpus of feature vectors that includes feature data associated with the target entity, and
(ii) extracting a second corpus of feature vectors that includes feature data associated with the medical claim;
computing, using a claim assessment machine learning model, a claim assessment inference based on the claim assessment machine learning model receiving the one or more corpora of feature vectors, wherein the claim assessment inference includes a likelihood of the medical claim being approved by the target entity on appeal;
automatically routing, via the one or more processors, the medical claim to a digital claim disposal queue when the claim assessment inference corresponds to a negative claim assessment inference, wherein automatically routing the medical claim to the digital claim disposal queue prevents compute resources of the computer-program product being used on the medical claim;
routing the medical claim to an adverse claim rationale machine learning model when the claim assessment inference corresponds to a positive claim assessment inference, wherein the medical claim includes a generic denial reason provided by the target entity that is insufficient for determining an exact reason that the target entity denied the medical claim; and
when the medical claim is routed to the adverse claim rationale machine learning model:
predicting, using the adverse claim rationale machine learning model, a claim denial type that corresponds to the medical claim from a plurality of predetermined claim denial types,
predicting, using the adverse claim rationale machine learning model, one or more proposed claim modifications to correct one or more defects in the medical claim;
automatically adapting the medical claim to an adapted medical claim by adjusting a data structure underpinning the medical claim based on the one or more proposed claim modifications when the medical claim satisfies automated claim remediation criteria; and
automatically transmitting, via a computer network, the adapted digital claim to the target entity.

14. The computer-program product according to claim 13, further comprising:
implementing a multi-stage denied claim classification and remediation pipeline, wherein:
a first stage of the multi-stage denied claim classification and remediation pipeline includes the computing, by the claim assessment machine learning model, the claim assessment inference,
a second stage of the multi-stage denied claim classification and remediation pipeline includes the computing, by the adverse claim rationale machine learning model, the claim denial type that corresponds to the medical claim and the one or more proposed claim modifications to correct the one or more defects in the medical claim, wherein the second stage of the multi-stage denied claim classification and remediation pipeline occurs after the first stage of the multi-stage denied claim classification and remediation pipeline, and
a third stage of the multi-stage denied claim classification and remediation pipeline includes automatically adapting the medical claim to the adapted medical claim.

15. The computer-program product according to claim 13, wherein:
the adverse claim rationale machine learning model is configured to decode or translate the generic denial reason provided by the target entity into an explainable denial reason that informs a downstream claim adaptation action.

16. The computer-program product according to claim 13, further comprising:
assessing, via the one or more processors, the claim denial type predicted for the medical claim by the adverse claim rationale machine learning model against the automated claim remediation criteria; and
identifying, via the one or more processors, the claim denial type predicted for the medical claim satisfies the automated claim remediation criteria, the automated claim remediation criteria is satisfied based on determining the claim denial type predicted for the medical claim corresponds to an automatically fixable claim denial type of a plurality of predetermined automatically fixable claim denial types.

17. The computer-program product according to claim 13, wherein:
the medical claim fails to satisfy the automated claim remediation criteria, and
the computer-program product further comprises computer instructions for performing operations including:
displaying, via a graphical user interface, a representation of the medical claim based on the medical claim failing to satisfy the automated claim remediation criteria, wherein the representation of the medical claim further includes a claim remediation user interface element that includes the one or more proposed claim modifications to the medical claim in natural language;
receiving, via the graphical user interface, a first user input selecting a claim correction button;
in response to receiving the first user input selecting the claim correction button, displaying a claim adjustment proposal user interface that presents a current value of the medical claim identified to be defective by the adverse claim rationale machine learning model and the one or more proposed claim modifications to the current value, wherein the one or more proposed claim modifications includes a proposed value;
receiving a second user input selecting an automated claim remediation button of the claim adjustment proposal user interface; and
in response to receiving the second user input selecting the automated claim remediation button:

automatically adapting the medical claim to the adapted medical claim by replacing the current value with the proposed value; and automatically transmitting, via the computer network the adapted medical claim that includes the proposed value to the target entity.

18. The computer-program product according to claim 13, further comprising:

obtaining a corpus of labeled training data samples, wherein each distinct labeled training data sample of the corpus of labeled training data samples includes a distinct historical medical claim, a corresponding denial type label, and a corresponding set of features of the distinct historical medical claim indicative of the corresponding denial type label, configuring the adverse claim rationale machine learning model based on a training of a target machine learning classification model using the corpus of labeled training data samples.

19. The computer-program product according to claim 13, further comprising:

obtaining a corpus of labeled sequential training data samples, wherein each labeled sequential training data sample includes:

an initial version of a medical claim that was denied by a subject entity, one or more distinct resubmissions of the medical claim, wherein each distinct resubmission of the medical claim includes at least one claim modification over a previous submission associated with the medical claim, and a corresponding outcome label for each distinct resubmission that indicates whether a subject resubmission was approved or denied; and configuring the claim assessment machine learning model based on a training of a target machine learning classification model using the corpus of labeled sequential training data samples.

20. The computer-program product according to claim 13, wherein:

the claim assessment inference corresponds to the negative claim assessment inference, and the computer-program product further comprises computer instructions for performing operations including:

bypassing a routing of the medical claim to the adverse claim rationale machine learning model based on the claim assessment inference corresponding to the negative claim assessment inference.

21. The computer-program product according to claim 13, further comprising:

identifying, via the one or more processors, a new medical claim that has not been filed with the target entity;

computing, using the claim assessment machine learning model, a claim assessment inference for the new medical claim that predicts a probability of approval if the new medical claim were to be filed with the target entity, wherein the probability of approval of the new medical claim fails to satisfy a predetermined minimum claim approval threshold;

identifying, via the one or more processors, an attempt by a user to electronically transmit, via the computer network, the new medical claim to the target entity; and in response to identifying the attempt to electronically transmit the new medical claim to the target entity:

preventing a submission of the new medical claim based on identifying that the probability of approval of the new medical claim fails to satisfy the predetermined minimum claim approval threshold, and surfacing, via a graphical user interface, a notification that informs the user the new medical claim is unlikely to be approved by the target entity, wherein the notification includes:

a message indicating that the probability of approval that corresponds to the new medical claim is below the predetermined minimum claim approval threshold, an explanation of one or more likely factors contributing to the probability of approval of the new medical claim being below the predetermined minimum claim approval threshold, and one or more proposed claim remediation actions for the new medical that, if implemented, increases a likelihood that the new medical claim is approved by the target entity.

* * * * *